US007890533B2

(12) United States Patent
Pollara

(10) Patent No.: US 7,890,533 B2
(45) Date of Patent: Feb. 15, 2011

(54) METHOD AND SYSTEM FOR INFORMATION EXTRACTION AND MODELING

(75) Inventor: Victor J. Pollara, Dickerson, MD (US)

(73) Assignee: Noblis, Inc., Falls Church, VA (US)

( * ) Notice: Subject to any disclaimer, the term of this patent is extended or adjusted under 35 U.S.C. 154(b) by 320 days.

(21) Appl. No.: 11/434,847

(22) Filed: May 17, 2006

(65) Prior Publication Data

US 2010/0169299 A1 Jul. 1, 2010

(51) Int. Cl.
*G06F 7/00* (2006.01)
*G06F 17/30* (2006.01)

(52) U.S. Cl. ................ 707/790; 707/796; 707/999.001; 715/221

(58) Field of Classification Search ....................... None
See application file for complete search history.

(56) References Cited

U.S. PATENT DOCUMENTS

| | | | | |
|---|---|---|---|---|
| 4,868,733 | A | 9/1989 | Fujisawa et al. | |
| 5,386,556 | A | 1/1995 | Hedin et al. | |
| 5,598,519 | A * | 1/1997 | Narayanan | 715/219 |
| 5,619,709 | A * | 4/1997 | Caid et al. | 715/209 |
| 5,632,009 | A | 5/1997 | Rao et al. | |
| 5,659,724 | A | 8/1997 | Borgida et al. | |
| 5,794,178 | A * | 8/1998 | Caid et al. | 704/9 |
| 5,880,742 | A | 3/1999 | Rao et al. | |
| 5,883,635 | A | 3/1999 | Rao et al. | |
| 6,085,202 | A | 7/2000 | Rao et al. | |
| 6,363,378 | B1 | 3/2002 | Conklin et al. | |
| 6,453,312 | B1 | 9/2002 | Goiffon et al. | |
| 6,453,315 | B1 | 9/2002 | Weissman et al. | |
| 6,519,588 | B1 | 2/2003 | Leschner | |
| 6,628,312 | B1 | 9/2003 | Rao et al. | |
| 6,629,081 | B1 * | 9/2003 | Cornelius et al. | 705/30 |
| 6,629,097 | B1 * | 9/2003 | Keith | 1/1 |
| 6,665,662 | B1 | 12/2003 | Kirkwood et al. | |
| 6,675,159 | B1 * | 1/2004 | Lin et al. | 707/3 |
| 6,694,329 | B2 | 2/2004 | Murray | |
| 6,766,316 | B2 * | 7/2004 | Caudill et al. | 1/1 |
| 6,795,825 | B2 | 9/2004 | Rishe | |
| 6,801,229 | B1 * | 10/2004 | Tinkler | 715/853 |

(Continued)

FOREIGN PATENT DOCUMENTS

WO WO 02/10980 A1 2/2002

OTHER PUBLICATIONS

Byron Marshall, Yiwen Zhang, Rao Shen, Edward Fox, Lillian N. Cassel, Convergence of Knowledge Management and E-Learning: The Getsmart Experience, 2003, IEEE, pp. 135-146.*

(Continued)

*Primary Examiner*—Mohammad Ali
*Assistant Examiner*—Angelica Ruiz
(74) *Attorney, Agent, or Firm*—Finnegan, Henderson, Farabow, Garrett & Dunner, L.L.P.

(57) ABSTRACT

Systems and methods for modeling information from a set of documents are disclosed. A tool allows a user to extract and model concepts of interest and relations among the concepts from a set of documents. The tool automatically configures a database of the model so that the model and extracted concepts from the documents may be customized, modified, and shared.

38 Claims, 33 Drawing Sheets

U.S. PATENT DOCUMENTS

| | | | | |
|---|---|---|---|---|
| 6,816,857 | B1 | 11/2004 | Weissman et al. | |
| 6,931,604 | B2 * | 8/2005 | Lane | 715/853 |
| 6,970,881 | B1 | 11/2005 | Mohan et al. | |
| 6,976,020 | B2 | 12/2005 | Anthony et al. | |
| 6,990,480 | B1 * | 1/2006 | Burt | 707/1 |
| 7,167,844 | B1 * | 1/2007 | Leong et al. | 705/80 |
| 7,242,406 | B2 * | 7/2007 | Robotham et al. | 345/581 |
| 7,251,637 | B1 * | 7/2007 | Caid et al. | 706/15 |
| 2002/0015042 | A1 * | 2/2002 | Robotham et al. | 345/581 |
| 2002/0049705 | A1 * | 4/2002 | Haviv-Segal et al. | 707/1 |
| 2002/0069221 | A1 | 6/2002 | Rao et al. | |
| 2002/0103775 | A1 | 8/2002 | Quass et al. | |
| 2002/0198885 | A1 | 12/2002 | Streepy, Jr. | |
| 2003/0007002 | A1 | 1/2003 | Hida et al. | |
| 2003/0014442 | A1 * | 1/2003 | Shiigi et al. | 707/513 |
| 2003/0050915 | A1 | 3/2003 | Allemang et al. | |
| 2003/0069908 | A1 * | 4/2003 | Anthony et al. | 707/513 |
| 2003/0083767 | A1 * | 5/2003 | Karlsberg | 700/103 |
| 2003/0131338 | A1 * | 7/2003 | Georgalas | 717/104 |
| 2003/0163366 | A1 * | 8/2003 | Taft | 705/12 |
| 2003/0182281 | A1 | 9/2003 | Wittkowski | |
| 2003/0217335 | A1 | 11/2003 | Chung et al. | |
| 2004/0049522 | A1 | 3/2004 | Streepy, Jr. | |
| 2004/0088308 | A1 * | 5/2004 | Bailey et al. | 707/100 |
| 2005/0055365 | A1 * | 3/2005 | Ramakrishnan et al. | 707/102 |
| 2005/0075832 | A1 | 4/2005 | Ikeguchi et al. | |
| 2005/0132284 | A1 * | 6/2005 | Lloyd et al. | 715/517 |
| 2005/0140694 | A1 * | 6/2005 | Subramanian et al. | 345/619 |
| 2005/0154701 | A1 | 7/2005 | Parunak et al. | |
| 2005/0165724 | A1 * | 7/2005 | West | 707/1 |
| 2005/0182764 | A1 | 8/2005 | Evans | |
| 2005/0192926 | A1 | 9/2005 | Liu et al. | |
| 2005/0210009 | A1 * | 9/2005 | Tran | 707/3 |
| 2005/0220351 | A1 | 10/2005 | Vanderwende et al. | |
| 2005/0256892 | A1 * | 11/2005 | Harken | 707/101 |
| 2005/0278321 | A1 * | 12/2005 | Vailaya et al. | 707/3 |
| 2005/0289102 | A1 * | 12/2005 | Das et al. | 707/1 |
| 2006/0123000 | A1 * | 6/2006 | Baxter et al. | 707/5 |
| 2006/0136589 | A1 * | 6/2006 | Konig et al. | 709/224 |
| 2006/0136805 | A1 * | 6/2006 | Conn et al. | 715/500 |
| 2006/0184566 | A1 * | 8/2006 | Lo et al. | 707/102 |
| 2006/0200763 | A1 * | 9/2006 | Michaelsen et al. | 715/523 |
| 2007/0073748 | A1 * | 3/2007 | Barney | 707/101 |

OTHER PUBLICATIONS

Terje Brasethvik et al., "Semantically accessing documents using conceptual model descriptions, Norwegian University of Technology and Science," 1999, XP-002458535, pp. 1-15 (16 pages, double-sided).

Amit Sheth et al., "Managing Semantic Content for the Web," IEEE Internet Computing, IEEE Service Center, New York, NY, vol. 6, No. 4, Jul. 2002, pp. 80-87, XP011094652 (8 pages, double-sided).

Nathalie Aussenac-Gilles et al., "Ontologies as Background Knowledge to Explore Document Collections," Institut de Recherche en Informatique de Toulouse, Toulouse, France, [Online] 2003, XP002458536, pp. 1-14 (14 pages, double-sided).

Christina Yip Chung et al., "Thematic Mapping—From Unstructured Documents to Taxonomies," Proceedings of the Eleventh International Conference on Information and Knowledge Management, 2002, pp. 608-610 (4 pages, double-sided).

International Search Report dated Nov. 26, 2007, in International Application No. PCT/US2007/011256 (15 pages).

Clemente, Bernadette E. and Pollara, Victor J., "Mapping the Course, Marking the Trail," IT Pro, Nov./Dec. 2005, pp. 10-15, IEEE Computer Society.

Inxight Software, Inc., "Inxight Thingfinder® Professional SDK," datasheet, 1 page, Aug. 2, 2006, www.inxight.com/pdfs/ThingFinder_Pro.pdf.

Inxight Software, Inc., "Inxight Enhances Entity Extraction in ThingFinder, Adds Fact Extraction to ThingFinder Professional," news release, PR Newswire Association LLC, 3 pages, Mar. 7, 2006, http://www.prnewswire.com/cgi-bin/stories,pl?ACCT=104&Story=/www/story/03-07-2006/0004314719&EDATE.

Inxight Software, Inc. and Visual Analytics, Inc., "Inxight and Visual Analytics Partner to Tag and Visualize Unstructured Data for Government Operations," Press Release, 2 pages, Aug. 2, 2006, http://www.visualanalytics..com/media/PressRelease/2006-08-02-prnews.html.

International Search Report for PCT/US2007/082340 (mailed Jul. 1, 2008) (6 pages).

Written Opinion of the International Searching Authority for PCT/US2007/082340 (mailed Jul. 1, 2008) (8 pages).

Giger, H. P. (Edited by Chiaramella, Yves), "Concept Based Retrieval in Classical IR Systems," Proceedings of the International Conference on Research and Development in Information Retrieval, Grenoble-France, vol. conf. 11, Jun. 13, 1988, pp. 275-289 (16 pages).

Moskovitch, Robert, et al., "Vaidurya—A Concept-Based, Context-Sensitive Search Engine for Clinical Guidelines," MEDINFO, vol. 11, No. 1, 2004, pp. 140-144 (5 pages).

Terje Brasethvik & Jon Atle Gulla, "Natural Language Analysis for Semantic Document Modeling," 2001, Springer-Verlag, pp. 127-140.

Written Opinion of the International Searching Authority for PCT/US2007/082340 (mailed May 5, 2009) (7 pages).

Terje Brasethvik et al., "Semantically accessing documents using conceptual model descriptions," Lecture Notes in Computer Science, Springer Verlag, Berlin, DE, vol. 1727, Jan. 1, 1999, pp. 321-333, XP002458535 ISSN: 0302-9743 (13 pages).

Lynette Hirschman, Alexander Yeh, Christian Blaschke, and Alfonso Valencia, "Overview of BioCreAtIvE: critical assessment of information extraction for biology," BMC Bioinformatics 2005, 6(Suppl 1):SI (10 pages).

Patricia Robinson, Erica Brown, John Burger, Nancy Chinchor, Aaron Douthat, Lisa Ferro, and Lynette Hirschman, "Overview: Information Extraction from Broadcast News," In Proc. DARPA Broadcast News Workshop, pp. 27-30 (4 pages), 1998.

Mark A. Greenwood and Mark Stevenson, "Improving Semi-Supervised Acquisition of Relation Extraction Patterns," Proceedings of the Workshop on Information Extraction Beyond the Document, pp. 29-35, Sydney, Jul. 2006 (9 pages).

Jerry R. Hobbs, "The Generic Information Extraction System," TIPSTER Text Program website, http://www.itl.nist.gov/iaui/894.02/related_projects/tipster/gen_ie.htm (6 pages).

Ralph Grishman, "Information Extraction: Techniques and Challenges," Lecture Notes in Computer Science 1299, pp. 10-27, Springer 1997 (13 pages).

* cited by examiner

FREQUENTLY OCCURING TEXT FRAGMENTS

GO TO:
- 5-GRAMS
- 4-GRAMS
- 3-GRAMS
- 2-GRAMS
- 1-GRAMS

| FREQUENCY | NGRAMS WHERE N=5 |
|---|---|
| 16 | ANTIGEN (PA) LETHAL FACTOR (LF) |
| 16 | PROTECTIVE ANTIGEN (PA) LETHAL FACTOR |
| 9 | AND IMPACT OF THE STUDY:

Figure 9:
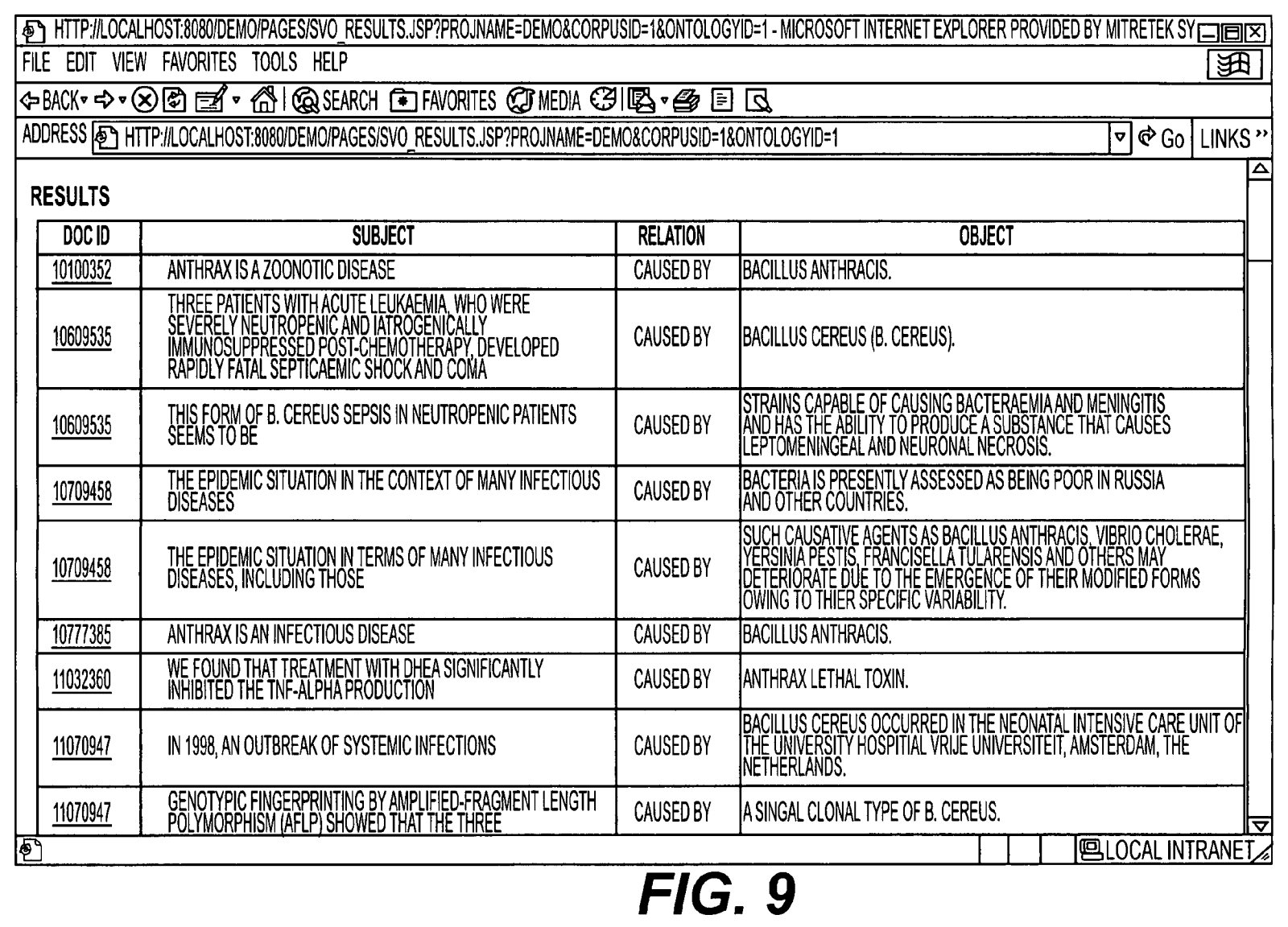

HTTP://LOCALHOST:8080/DEMO/PAGES/SVO_RESULTS.JSP?PROJNAME=DEMO&CORPUSID=1&ONTOLOGYID=1 - MICROSOFT INTERNET EXPLORER PROVIDED BY MITRETEK SY

FILE EDIT VIEW FAVORITES TOOLS HELP

BACK SEARCH FAVORITES MEDIA

ADDRESS HTTP://LOCALHOST:8080/DEMO/PAGES/SVO_RESULTS.JSP?PROJNAME=DEMO&CORPUSID=1&ONTOLOGYID=1 Go LINKS »

RESULTS

| DOC ID | SUBJECT | RELATION | OBJECT |
|---|---|---|---|
| 10100352 | ANTHRAX IS A ZOONOTIC DISEASE | CAUSED BY | BACILLUS ANTHRACIS. |
| 10609535 | THREE PATIENTS WITH ACUTE LEUKAEMIA, WHO WERE SEVERELY NEUTROPENIC AND IATROGENICALLY IMMUNOSUPPRESSED POST-CHEMOTHERAPY, DEVELOPED RAPIDLY FATAL SEPTICAEMIC SHOCK AND COMA | CAUSED BY | BACILLUS CEREUS (B. CEREUS). |
| 10609535 | THIS FORM OF B. CEREUS SEPSIS IN NEUTROPENIC PATIENTS SEEMS TO BE | CAUSED BY | STRAINS CAPABLE OF CAUSING BACTERAEMIA AND MENINGITIS AND HAS THE ABILITY TO PRODUCE A SUBSTANCE THAT CAUSES LEPTOMENINGEAL AND NEURONAL NECROSIS. |
| 10709458 | THE EPIDEMIC SITUATION IN THE CONTEXT OF MANY INFECTIOUS DISEASES | CAUSED BY | BACTERIA IS PRESENTLY ASSESSED AS BEING POOR IN RUSSIA AND OTHER COUNTRIES. |
| 10709458 | THE EPIDEMIC SITUATION IN TERMS OF MANY INFECTIOUS DISEASES, INCLUDING THOSE | CAUSED BY | SUCH CAUSATIVE AGENTS AS BACILLUS ANTHRACIS, VIBRIO CHOLERAE, YERSINIA PESTIS, FRANCISELLA TULARENSIS AND OTHERS MAY DETERIORATE DUE TO THE EMERGENCE OF THEIR MODIFIED FORMS OWING TO THIER SPECIFIC VARIABILITY. |
| 10777385 | ANTHRAX IS AN INFECTIOUS DISEASE | CAUSED BY | BACILLUS ANTHRACIS. |
| 11032360 | WE FOUND THAT TREATMENT WITH DHEA SIGNIFICANTLY INHIBITED THE TNF-ALPHA PRODUCTION | CAUSED BY | ANTHRAX LETHAL TOXIN. |
| 11070947 | IN 1998, AN OUTBREAK OF SYSTEMIC INFECTIONS | CAUSED BY | BACILLUS CEREUS OCCURRED IN THE NEONATAL INTENSIVE CARE UNIT OF THE UNIVERSITY HOSPITIAL VRIJE UNIVERSITEIT, AMSTERDAM, THE NETHERLANDS. |
| 11070947 | GENOTYPIC FINGERPRINTING BY AMPLIFIED-FRAGMENT LENGTH POLYMORPHISM (AFLP) SHOWED THAT THE THREE | CAUSED BY | A SINGAL CLONAL TYPE OF B. CEREUS. |

LOCAL INTRANET

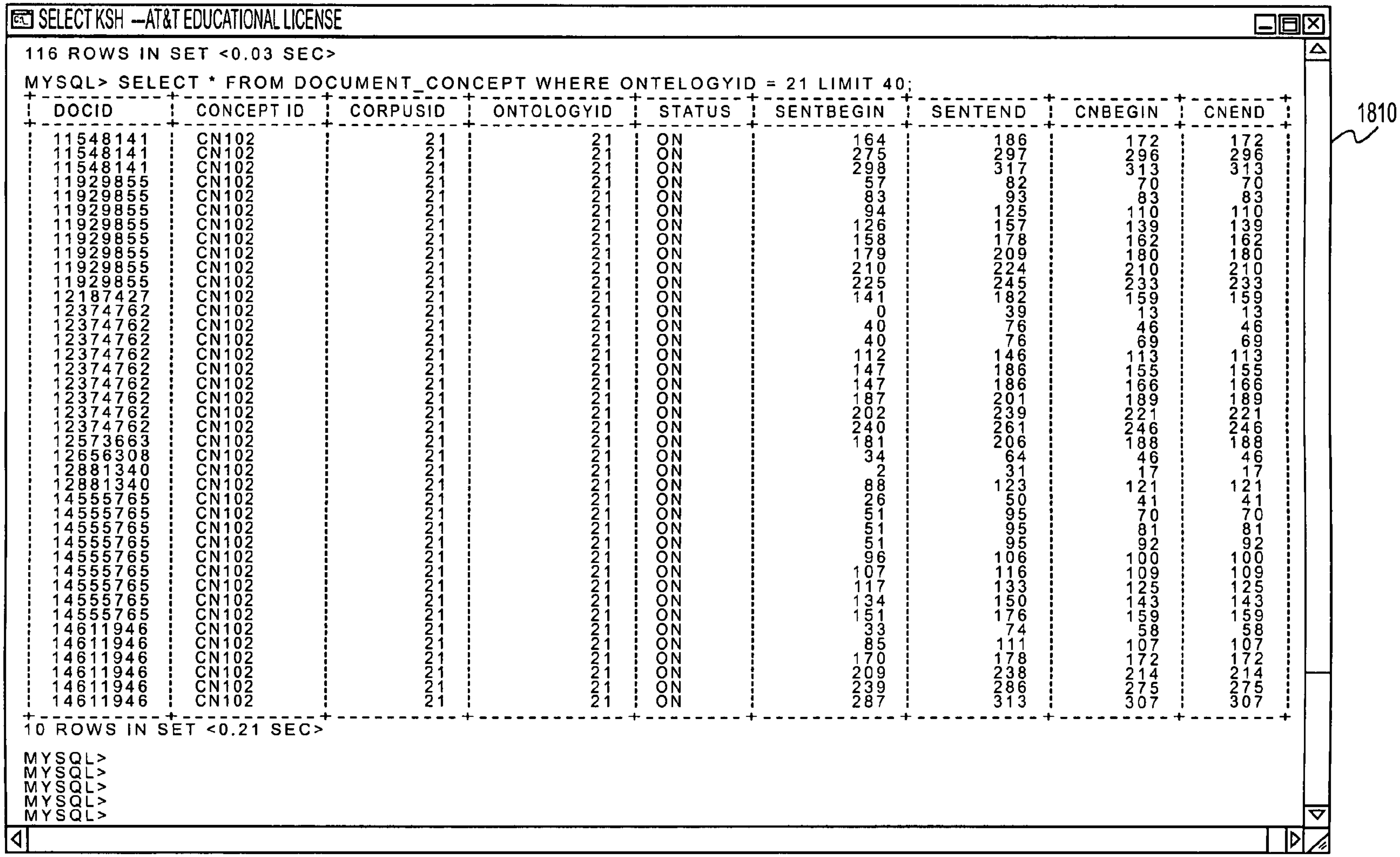

SELECT KSH —AT&T EDUCATIONAL LICENSE

116 ROWS IN SET <0.03 SEC>

MYSQL> SELECT * FROM DOCUMENT_CONCEPT WHERE ONTELOGYID = 21 LIMIT 40;

| DOCID | CONCEPT ID | CORPUSID | ONTOLOGYID | STATUS | SENTBEGIN | SENTEND | CNBEGIN | CNEND |
|---|---|---|---|---|---|---|---|---|
| 11548141 | CN102 | 21 | 21 | ON | 164 | 186 | 172 | 172 |
| 11548141 | CN102 | 21 | 21 | ON | 275 | 297 | 296 | 296 |
| 11548141 | CN102 | 21 | 21 | ON | 298 | 317 | 313 | 313 |
| 11929855 | CN102 | 21 | 21 | ON | 57 | 82 | 70 | 70 |
| 11929855 | CN102 | 21 | 21 | ON | 83 | 93 | 83 | 83 |
| 11929855 | CN102 | 21 | 21 | ON | 94 | 125 | 110 | 110 |
| 11929855 | CN102 | 21 | 21 | ON | 126 | 157 | 139 | 139 |
| 11929855 | CN102 | 21 | 21 | ON | 158 | 178 | 162 | 162 |
| 11929855 | CN102 | 21 | 21 | ON | 179 | 209 | 180 | 180 |
| 11929855 | CN102 | 21 | 21 | ON | 210 | 224 | 210 | 210 |
| 11929855 | CN102 | 21 | 21 | ON | 225 | 245 | 233 | 233 |
| 12187427 | CN102 | 21 | 21 | ON | 141 | 182 | 159 | 159 |
| 12374762 | CN102 | 21 | 21 | ON | 0 | 39 | 13 | 13 |
| 12374762 | CN102 | 21 | 21 | ON | 40 | 76 | 46 | 46 |
| 12374762 | CN102 | 21 | 21 | ON | 40 | 76 | 69 | 69 |
| 12374762 | CN102 | 21 | 21 | ON | 112 | 146 | 113 | 113 |
| 12374762 | CN102 | 21 | 21 | ON | 147 | 186 | 155 | 155 |
| 12374762 | CN102 | 21 | 21 | ON | 147 | 186 | 166 | 166 |
| 12374762 | CN102 | 21 | 21 | ON | 187 | 201 | 189 | 189 |
| 12374762 | CN102 | 21 | 21 | ON | 202 | 239 | 221 | 221 |
| 12374762 | CN102 | 21 | 21 | ON | 240 | 261 | 246 | 246 |
| 12573663 | CN102 | 21 | 21 | ON | 181 | 206 | 188 | 188 |
| 12656308 | CN102 | 21 | 21 | ON | 34 | 64 | 46 | 46 |
| 12881340 | CN102 | 21 | 21 | ON | 2 | 31 | 17 | 17 |
| 12881340 | CN102 | 21 | 21 | ON | 88 | 123 | 121 | 121 |
| 14555765 | CN102 | 21 | 21 | ON | 26 | 50 | 41 | 41 |
| 14555765 | CN102 | 21 | 21 | ON | 51 | 95 | 70 | 70 |
| 14555765 | CN102 | 21 | 21 | ON | 51 | 95 | 81 | 81 |
| 14555765 | CN102 | 21 | 21 | ON | 51 | 95 | 92 | 92 |
| 14555765 | CN102 | 21 | 21 | ON | 96 | 106 | 100 | 100 |
| 14555765 | CN102 | 21 | 21 | ON | 107 | 116 | 109 | 109 |
| 14555765 | CN102 | 21 | 21 | ON | 117 | 133 | 125 | 125 |
| 14555765 | CN102 | 21 | 21 | ON | 134 | 150 | 143 | 143 |
| 14555765 | CN102 | 21 | 21 | ON | 151 | 176 | 159 | 159 |
| 14611946 | CN102 | 21 | 21 | ON | 33 | 74 | 58 | 58 |
| 14611946 | CN102 | 21 | 21 | ON | 85 | 111 | 107 | 107 |
| 14611946 | CN102 | 21 | 21 | ON | 170 | 178 | 172 | 172 |
| 14611946 | CN102 | 21 | 21 | ON | 209 | 238 | 214 | 214 |
| 14611946 | CN102 | 21 | 21 | ON | 239 | 286 | 275 | 275 |
| 14611946 | CN102 | 21 | 21 | ON | 287 | 313 | 307 | 307 |

10 ROWS IN SET <0.21 SEC>

MYSQL>
MYSQL>
MYSQL>
MYSQL>
MYSQL>

FIG. 18A

Figure 18B:
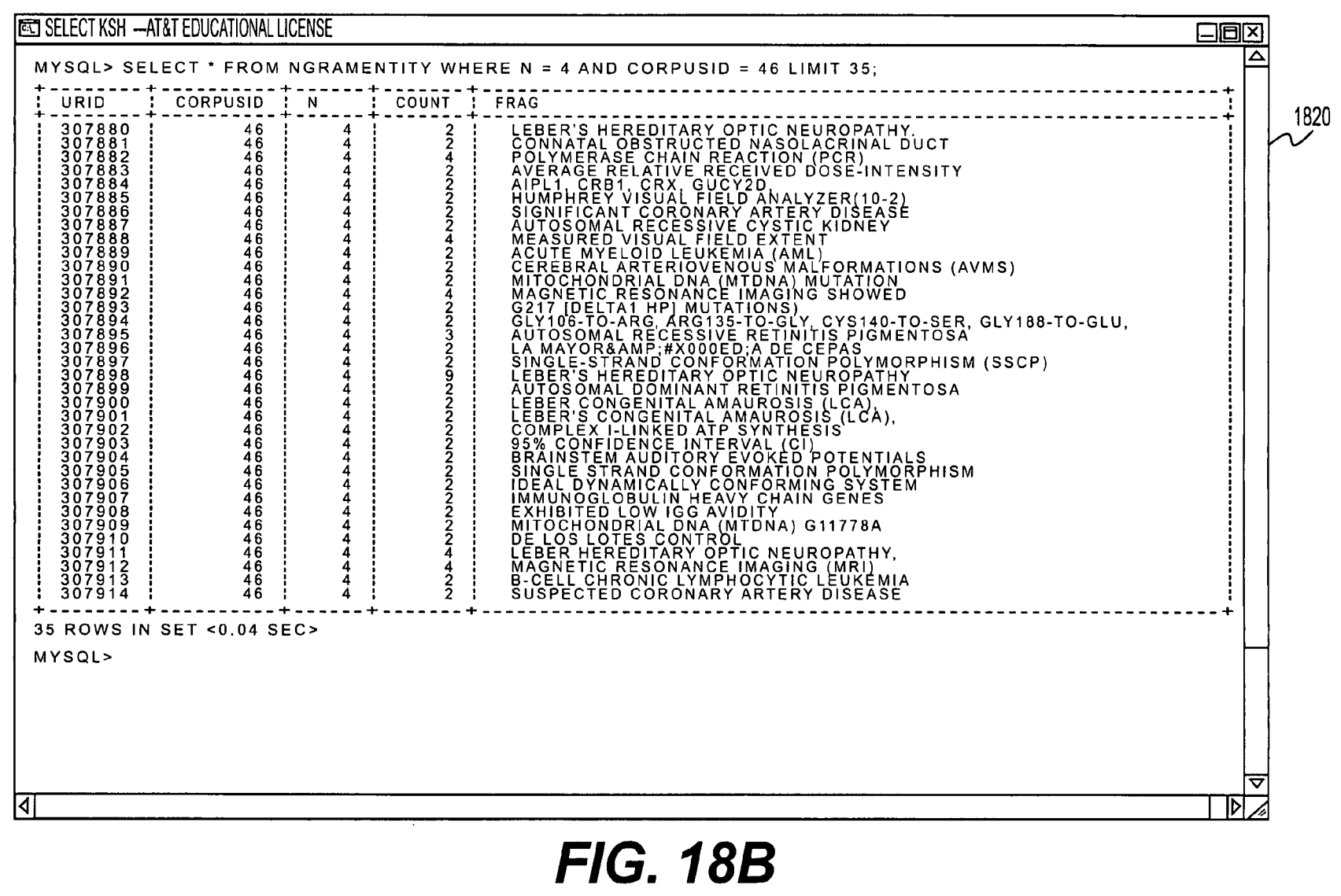

SELECT KSH —AT&T EDUCATIONAL LICENSE

1820

```
MYSQL> SELECT * FROM NGRAMENTITY WHERE N = 4 AND CORPUSID = 46 LIMIT 35;
+--------+----------+-----+-------+---------------------------------------------------------+
| URID   | CORPUSID | N   | COUNT | FRAG                                                    |
+--------+----------+-----+-------+---------------------------------------------------------+
| 307880 |       46 |   4 |     2 | LEBER'S HEREDITARY OPTIC NEUROPATHY,                    |
| 307881 |       46 |   4 |     2 | CONNATAL OBSTRUCTED NASOLACRINAL DUCT                   |
| 307882 |       46 |   4 |     4 | POLYMERASE CHAIN REACTION (PCR)                         |
| 307883 |       46 |   4 |     2 | AVERAGE RELATIVE RECEIVED DOSE-INTENSITY                |
| 307884 |       46 |   4 |     2 | AIPL1, CRB1, CRX, GUCY2D,                               |
| 307885 |       46 |   4 |     2 | HUMPHREY VISUAL FIELD ANALYZER(10-2)                    |
| 307886 |       46 |   4 |     2 | SIGNIFICANT CORONARY ARTERY DISEASE                     |
| 307887 |       46 |   4 |     2 | AUTOSOMAL RECESSIVE CYSTIC KIDNEY                       |
| 307888 |       46 |   4 |     4 | MEASURED VISUAL FIELD EXTENT                            |
| 307889 |       46 |   4 |     2 | ACUTE MYELOID LEUKEMIA (AML)                            |
| 307890 |       46 |   4 |     2 | CEREBRAL ARTERIOVENOUS MALFORMATIONS (AVMS)             |
| 307891 |       46 |   4 |     2 | MITOCHONDRIAL DNA (MTDNA) MUTATION                      |
| 307892 |       46 |   4 |     4 | MAGNETIC RESONANCE IMAGING SHOWED                       |
| 307893 |       46 |   4 |     2 | G217 [DELTA1 HP] MUTATIONS)                             |
| 307894 |       46 |   4 |     2 | GLY106-TO-ARG, ARG135-TO-GLY, CYS140-TO-SER, GLY188-TO-GLU, |
| 307895 |       46 |   4 |     3 | AUTOSOMAL RECESSIVE RETINITIS PIGMENTOSA                |
| 307896 |       46 |   4 |     2 | LA MAYOR&AMP;#X000ED;A DE CEPAS                         |
| 307897 |       46 |   4 |     2 | SINGLE-STRAND CONFORMATION POLYMORPHISM (SSCP)          |
| 307898 |       46 |   4 |     9 | LEBER'S HEREDITARY OPTIC NEUROPATHY                     |
| 307899 |       46 |   4 |     2 | AUTOSOMAL DOMINANT RETINITIS PIGMENTOSA                 |
| 307900 |       46 |   4 |     2 | LEBER CONGENITAL AMAUROSIS (LCA),                       |
| 307901 |       46 |   4 |     2 | LEBER'S CONGENITAL AMAUROSIS (LCA),                     |
| 307902 |       46 |   4 |     2 | COMPLEX I-LINKED ATP SYNTHESIS                          |
| 307903 |       46 |   4 |     2 | 95% CONFIDENCE INTERVAL (CI)                            |
| 307904 |       46 |   4 |     2 | BRAINSTEM AUDITORY EVOKED POTENTIALS                    |
| 307905 |       46 |   4 |     2 | SINGLE STRAND CONFORMATION POLYMORPHISM                 |
| 307906 |       46 |   4 |     2 | IDEAL DYNAMICALLY CONFORMING SYSTEM                     |
| 307907 |       46 |   4 |     2 | IMMUNOGLOBULIN HEAVY CHAIN GENES                        |
| 307908 |       46 |   4 |     2 | EXHIBITED LOW IGG AVIDITY                               |
| 307909 |       46 |   4 |     2 | MITOCHONDRIAL DNA (MTDNA) G11778A                       |
| 307910 |       46 |   4 |     2 | DE LOS LOTES CONTROL                                    |
| 307911 |       46 |   4 |     4 | LEBER HEREDITARY OPTIC NEUROPATHY,                      |
| 307912 |       46 |   4 |     4 | MAGNETIC RESONANCE IMAGING (MRI)                        |
| 307913 |       46 |   4 |     2 | B-CELL CHRONIC LYMPHOCYTIC LEUKEMIA                     |
| 307914 |       46 |   4 |     2 | SUSPECTED CORONARY ARTERY DISEASE                       |
+--------+----------+-----+-------+---------------------------------------------------------+
35 ROWS IN SET <0.04 SEC>
MYSQL>
```

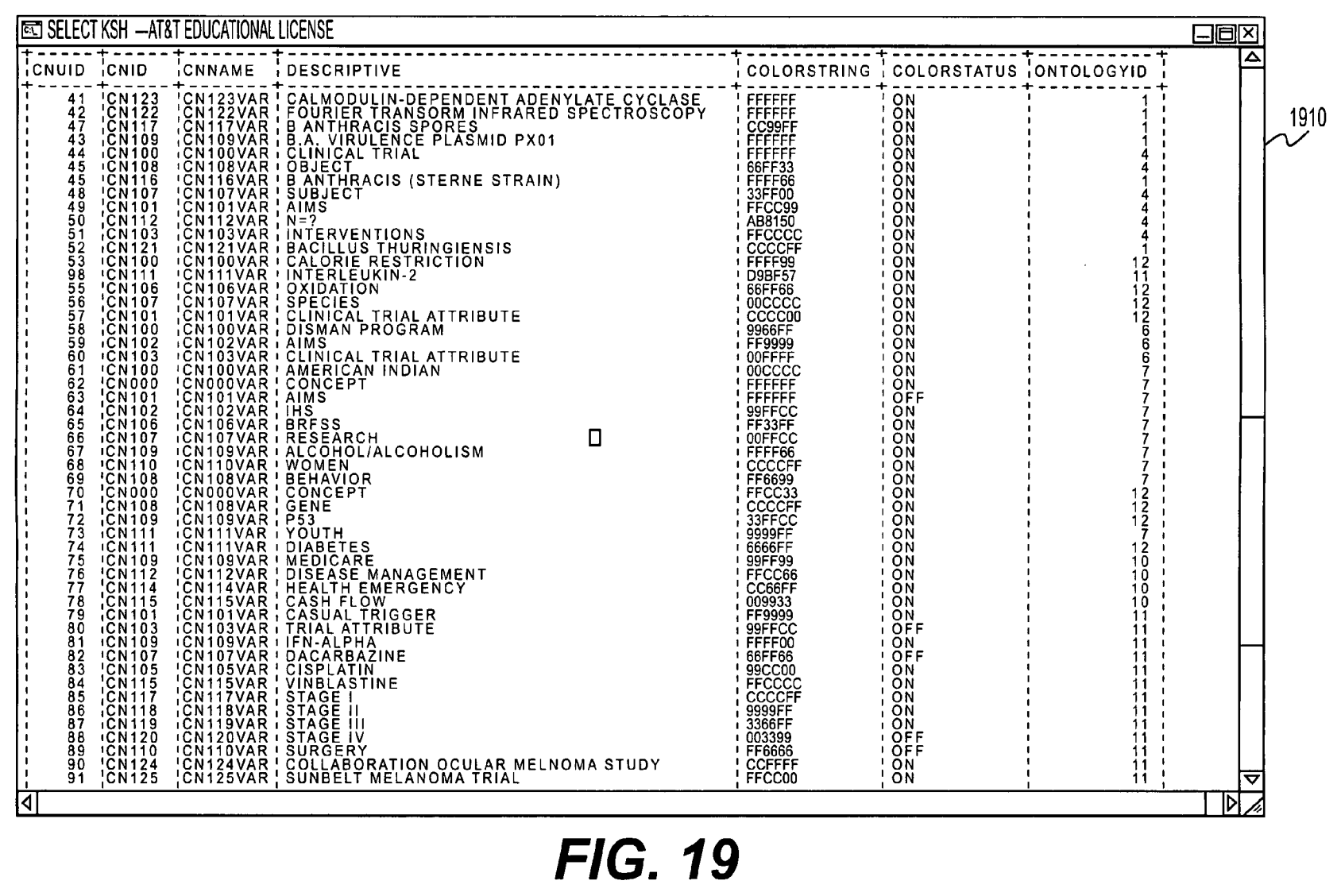

SELECT KSH —AT&T EDUCATIONAL LICENSE

| CNUID | CNID | CNNAME | DESCRIPTIVE | COLORSTRING | COLORSTATUS | ONTOLOGYID |
|---|---|---|---|---|---|---|
| 41 | CN123 | CN123VAR | CALMODULIN-DEPENDENT ADENYLATE CYCLASE | FFFFFF | ON | 1 |
| 42 | CN122 | CN122VAR | FOURIER TRANSORM INFRARED SPECTROSCOPY | FFFFFF | ON | 1 |
| 47 | CN117 | CN117VAR | B ANTHRACIS SPORES | CC99FF | ON | 1 |
| 43 | CN109 | CN109VAR | B.A. VIRULENCE PLASMID PX01 | FFFFFF | ON | 1 |
| 44 | CN100 | CN100VAR | CLINICAL TRIAL | FFFFFF | ON | 4 |
| 45 | CN108 | CN108VAR | OBJECT | 66FF33 | ON | 4 |
| 45 | CN116 | CN116VAR | B ANTHRACIS (STERNE STRAIN) | FFFF66 | ON | 1 |
| 48 | CN107 | CN107VAR | SUBJECT | 33FF00 | ON | 4 |
| 49 | CN101 | CN101VAR | AIMS | FFCC99 | ON | 4 |
| 50 | CN112 | CN112VAR | N=? | AB8150 | ON | 4 |
| 51 | CN103 | CN103VAR | INTERVENTIONS | FFCCCC | ON | 4 |
| 52 | CN121 | CN121VAR | BACILLUS THURINGIENSIS | CCCCFF | ON | 1 |
| 53 | CN100 | CN100VAR | CALORIE RESTRICTION | FFFF99 | ON | 12 |
| 98 | CN111 | CN111VAR | INTERLEUKIN-2 | D9BF57 | ON | 11 |
| 55 | CN106 | CN106VAR | OXIDATION | 66FF66 | ON | 12 |
| 56 | CN107 | CN107VAR | SPECIES | 00CCCC | ON | 12 |
| 57 | CN101 | CN101VAR | CLINICAL TRIAL ATTRIBUTE | CCCC00 | ON | 12 |
| 58 | CN100 | CN100VAR | DISMAN PROGRAM | 9966FF | ON | 6 |
| 59 | CN102 | CN102VAR | AIMS | FF9999 | ON | 6 |
| 60 | CN103 | CN103VAR | CLINICAL TRIAL ATTRIBUTE | 00FFFF | ON | 6 |
| 61 | CN100 | CN100VAR | AMERICAN INDIAN | 00CCCC | ON | 7 |
| 62 | CN000 | CN000VAR | CONCEPT | FFFFFF | ON | 7 |
| 63 | CN101 | CN101VAR | AIMS | FFFFFF | OFF | 7 |
| 64 | CN102 | CN102VAR | IHS | 99FFCC | ON | 7 |
| 65 | CN106 | CN106VAR | BRFSS | FF33FF | ON | 7 |
| 66 | CN107 | CN107VAR | RESEARCH | 00FFCC | ON | 7 |
| 67 | CN109 | CN109VAR | ALCOHOL/ALCOHOLISM | FFFF66 | ON | 7 |
| 68 | CN110 | CN110VAR | WOMEN | CCCCFF | ON | 7 |
| 69 | CN108 | CN108VAR | BEHAVIOR | FF6699 | ON | 7 |
| 70 | CN000 | CN000VAR | CONCEPT | FFCC33 | ON | 12 |
| 71 | CN108 | CN108VAR | GENE | CCCCFF | ON | 12 |
| 72 | CN109 | CN109VAR | P53 | 33FFCC | ON | 12 |
| 73 | CN111 | CN111VAR | YOUTH | 9999FF | ON | 7 |
| 74 | CN111 | CN111VAR | DIABETES | 6666FF | ON | 12 |
| 75 | CN109 | CN109VAR | MEDICARE | 99FF99 | ON | 10 |
| 76 | CN112 | CN112VAR | DISEASE MANAGEMENT | FFCC66 | ON | 10 |
| 77 | CN114 | CN114VAR | HEALTH EMERGENCY | CC66FF | ON | 10 |
| 78 | CN115 | CN115VAR | CASH FLOW | 009933 | ON | 10 |
| 79 | CN101 | CN101VAR | CASUAL TRIGGER | FF9999 | ON | 11 |
| 80 | CN103 | CN103VAR | TRIAL ATTRIBUTE | 99FFCC | OFF | 11 |
| 81 | CN109 | CN109VAR | IFN-ALPHA | FFFF00 | ON | 11 |
| 82 | CN107 | CN107VAR | DACARBAZINE | 66FF66 | OFF | 11 |
| 83 | CN105 | CN105VAR | CISPLATIN | 99CC00 | ON | 11 |
| 84 | CN115 | CN115VAR | VINBLASTINE | FFCCCC | ON | 11 |
| 85 | CN117 | CN117VAR | STAGE I | CCCCFF | ON | 11 |
| 86 | CN118 | CN118VAR | STAGE II | 9999FF | ON | 11 |
| 87 | CN119 | CN119VAR | STAGE III | 3366FF | ON | 11 |
| 88 | CN120 | CN120VAR | STAGE IV | 003399 | OFF | 11 |
| 89 | CN110 | CN110VAR | SURGERY | FF6666 | OFF | 11 |
| 90 | CN124 | CN124VAR | COLLABORATION OCULAR MELNOMA STUDY | CCFFFF | ON | 11 |
| 91 | CN125 | CN125VAR | SUNBELT MELANOMA TRIAL | FFCC00 | ON | 11 |

FIG. 19

SELECT SUBSET
CN100: YES
CN111: YES
QUERYING DATABASE

| DOCUMENT | TITLE |
|---|---|
| 12765339 | CHARACTERIZATION OF DOMINANT-NEGATIVE FORMS OF ANTHRAX PROTECTIVE ANTIGEN. |
| 7961869 | THE CHYMOTRYPSIN-SENSITIVE SITE, FFD315, IN ANTHRAX TOXIN PROTECTIVE

METHOD AND SYSTEM FOR INFORMATION EXTRACTION AND MODELING

FIELD OF THE INVENTION

The present invention relates generally to information extraction, and more particularly, to methods and systems for extracting information from a collection of documents and modeling the extracted information using customized tools.

BACKGROUND OF THE INVENTION

Computerized document creation systems and the rapid growth of the Internet have led to an explosion in the number of documents of all types (e.g., text files, web pages, etc.). Internet search engines, such as Google™, have responded to the need to search through immense document sets by offering basic search tools for finding topically focused sets of documents. It is possible to create and refine searches using, for example, Boolean combinations of keywords, that is, keywords together with Boolean operators such as "AND," "OR", "NOT," etc. to specify relationships between the keywords. Advanced approaches for refining searches include, for example, whole text matching or user profiling to tailor results to the kinds of documents the user has sought before.

Regardless of search sophistication, users often must wade through an unmanageable number of documents and examine the documents one by one to determine, for example, the most relevant documents. Furthermore, the ongoing, enormous growth in the number of available documents seems to insure that even with future advances in search capabilities, users will continue to receive large result sets of relevant documents, no matter how sophisticated searching becomes.

There is currently no intuitive, easy-to-use tool that helps an ordinary user do all the following tasks on a topically focused set of documents: (1) analyze the entire set for its informational content, (2) with these analyses and the user's own domain knowledge, enable the user to build an intuitive, visual model of the concepts in the document set, (3) then use the model to drive extraction and location of those concepts in the documents, (4) enable the user to aggregate and process extracted information, (5) enable the user to export the model, the data, and reports conveniently, for sharing with other interested parties, who can upload the model and data on their own computer, (6) support easy and intuitive iteration of all of these steps.

Researchers in technical fields may have access to hundreds of thousands of electronic versions of research papers, making research increasingly complex and fast-paced. For example, the National Library of Medicine provides access to more than 14 million citations in the field of biomedical research. Frequently, a researcher needs to refine his search technique when faced with a large set of documents or search results to retrieve a smaller set of more relevant information. However, especially for complex research projects, these types of searches are difficult to create and manipulate because of the length of the search text required. Furthermore, iterative searching of this nature can be quite time-consuming. Additionally, information retrieved from these searches is not easily viewed, saved, or shared among multiple users.

For example, a researcher performing a PubMed® search for articles related to a clinical trial for anthrax might enter the following search terms into the search engine: "clinical trial AND anthrax AND test." This search might return more than 100,000 documents, typically displayed as textual fragments with links to the actual documents spread over thousands of web pages. The researcher will have great difficulty navigating through the thousands web pages to find a smaller number of documents, and will have even greater difficulty reading each document one by one to extract information. If the researcher tries to refine the search to retrieve a smaller, more relevant set of documents, the researcher must return to the original search and modify the terms used. Ultimately, the researcher may end up with an unmanageable search string containing twenty or more words.

Having received a list of documents that result from a search, most researchers are left with the tedious task of scanning through the list to see if any of the documents are really relevant to their needs. Those documents that look relevant must be opened and scanned to see what is in them. Further, it is difficult to share the results of an iterative search with others, because the researcher cannot easily save a copy of each set of the search terms or a copy of the extracted information using conventional search tools. Moreover, a document set may contain aggregate information that is not contained completely in any single document, so that a user may not want to reduce the document set to a size small enough to read in full. Accordingly, there exists the need for a tool to create persistent models of information that may be easily manipulated, refined, saved, and shared, where these models provide an intuitive, visual aid to help the user define the concepts of interest, define extractors associated with the concepts, to launch extraction of those concepts, to analyze, aggregate, and output extracted information.

To extract information is to remove it from its original, natural language format. Currently available desktop applications for extraction perform single purpose tasks, such as excerption or summarization, but are limited in their usefulness and do not provide a user with much flexibility in configuring the them. Typical heavyweight or enterprise-scale extraction systems allow an expert to design customized functions for excerpting, summarizing, and presenting information from a class of documents. Trained experts may, for example, build extractors that arrange extracted text fragments in an table format for viewing, or fill templates that represent various multi-component concepts requested by a ordinary user of the system. Currently available tools may require a specially prepared set of training documents to define a concept taxonomy that can be used to categorize large sets of documents similar to the training documents. Current tools may also locate and highlight entities that belong to predefined categories (e.g., personal names, company names, geographical names), and allow experts to define extractors to identify specific text patterns.

One disadvantage of current enterprise-scale extraction systems, such as InXight's FactFinder™ editor (www.inxight.com), is that they do not allow an ordinary user, i.e., someone not specially trained to customize the system, to create a persistent or portable model of information that mirrors that individual's mental model of a subject. Another disadvantage of some commercial tools is that, although they may locate specific information in texts and highlight it, the highlighted information is often presented in an unmanageable format. For example, if a user starts with 6,000 documents, the extraction tool may present 6,000 documents highlighting or colorizing the concepts requested by a user. Even though the concepts may be highlighted in the texts, the sheer number of documents is still unmanageable for a typical user. Yet another disadvantage of current enterprise-scale systems is that they are costly to purchase and manage because they require trained experts to run them. Because they are so expensive, such extraction systems are only justified for large groups of similar users who are interested in the same kinds of information (e.g., a group of intelligence analysts).

Accordingly, there is a need for a lightweight tool that enables a user to model, extract, and aggregate information contained in any topically focused document set, such as a document set that results from an Internet search using specific keywords. Since no two persons have the same mental model of a subject area, a tool is needed that allows a user to design an individual model of information and to iteratively extract information from the documents, analyze it, and present the extracted information in ways that reflects a user's own conceptualization and organization of the information.

SUMMARY

Embodiments of the invention provide a method for creating a model of information by preparing a set of documents; receiving a plurality of concepts of interest to a user; creating a model of the concepts, wherein each graphical element of the visualization of the model may have one or more extractors assigned to it either automatically or by the user; and extracting information from the set of documents according to the model.

Other embodiments of the invention provide a method for modeling information from a set of documents by receiving a plurality of concepts of interest to a user; creating a model including representations of the plurality of concepts, wherein a representation of a first concept of the plurality of concepts in the model corresponds to an extractor; and based on a user selection of the representation of the first concept, extracting information related to the first concept from the set of documents using the corresponding extractor.

Other embodiments of the invention provide a method for modeling information from a set of documents by receiving a plurality of concepts of interest to a user; creating a model including representations of the plurality of concepts, wherein a representation of a first concept of the plurality of concepts in the model corresponds to an extractor; based on a user selection of the representation of the first concept, extracting information related to the first concept from the set of documents using the corresponding extractor; and customizing the model based on user input in response to the extracted information.

Other embodiments of the invention provide a method for modeling information from a set of documents, comprising: receiving a plurality of concepts of interest to a user; creating a model including representations of the plurality of concepts, wherein a representation of a first concept of the plurality of concepts in the model corresponds to an extractor; based on a user selection of the representation of the first concept, extracting information related to the first concept from the set of documents using the corresponding extractor; customizing the model based on user input in response to the extracted information; and exporting the customized model.

Other embodiments of the invention provide a method for creating a model of information by preparing a set of documents; receiving a plurality of concepts of interest to a user; creating a model of the concepts, wherein each graphical element of the visualization of the model may have one or more extractors assigned to it either automatically or by the user; extracting information from the set of documents according to the model; and providing the user with means for interpreting, manipulating, and analyzing the extracted information.

Other embodiments of the invention provide a method for creating a model of information contained in a set of documents by receiving a plurality of concepts of interest to a user; creating the model including representations of the plurality of concepts, wherein a representation of a first concept of the plurality of concepts in the model corresponds to an extractor; based on a user selection of the representation of the first concept, extracting information related to the first concept from the set of documents using the corresponding extractor; and presenting the extracted information to the user.

Other embodiments of the invention provide a system for modeling information from a set of documents, comprising a receiving component configured to receive a plurality of concepts of interest to a user; a modeling component configured to create a model including representations of the plurality of concepts, wherein a representation of a first concept of the plurality of concepts in the model corresponds to an extractor; and an extraction component configured to extract information, based on a user selection of the representation of the first concept, related to the first concept from the set of documents using the corresponding extractor.

Other embodiments of the invention provide a system for modeling information from a set of documents, comprising means for receiving a plurality of concepts of interest to a user; means for creating a model including representations of the plurality of concepts, wherein a representation of a first concept of the plurality of concepts in the model corresponds to an extractor; and means for based on a user selection of the representation of the first concept, extracting information related to the first concept from the set of documents using the corresponding extractor.

Other embodiments of the invention provide a computer-readable medium including instructions for performing a method for modeling information from a set of documents, the method comprising receiving a plurality of concepts of interest to a user; creating a model including representations of the plurality of concepts, wherein a representation of a first concept of the plurality of concepts in the model corresponds to an extractor; and based on a user selection of the representation of the first concept, extracting information related to the first concept from the set of documents using the corresponding extractor.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

BRIEF DESCRIPTION OF THE DRAWINGS

FIGS. 6-17 illustrate exemplary user interface displays consistent with an embodiment of the present invention;

FIGS. 18-19 illustrate exemplary concept tables and document analysis tables consistent with an embodiment of the present invention;

DETAILED DESCRIPTION

Reference will now be made in detail to exemplary embodiments of the invention, examples of which are illustrated in the accompanying drawings. Wherever possible, the same reference numbers will be used throughout the drawings to refer to the same or like parts.

Systems and methods consistent with certain embodiments of the present invention provide a customized tool for modeling and extracting information from a collection of documents. The tool may include a graphical user interface that enables a user to create a unique model of the information he wishes to search for. As the user creates and manipulates the model, the tool performs a number of automatic tasks in preparation for data extraction. Once the model is created, the user may launch an extraction, view the results, and revise the model to improve the quality of a subsequent data extraction.

To develop a model that reflects a user's unique thought process, the tool may prompt the user to input core concepts and data relationships using any number of graphical representations. For example, the user may prefer to identify core concepts and their connections using an entity-relation diagram. The user may be prompted to input important concepts that are then displayed as entity nodes. The user may then be prompted to connect the concepts using relation arrows between the nodes. In another example, the user may choose to input a list of text fragments and rank them in an order from most to least relevant.

As the user builds and manipulates the model, the tool automatically generates extractors that will search the collected documents for concepts of interest to the user. The extractors may incorporate many different types of search tools such as word frequency vectors, heuristic text summaries, construct frequencies, entity-relations, etc. The tool also automatically configures a database while the user develops the model to prepare a place where extracted concepts will be stored in a useful and meaningful way.

Figure 1A:
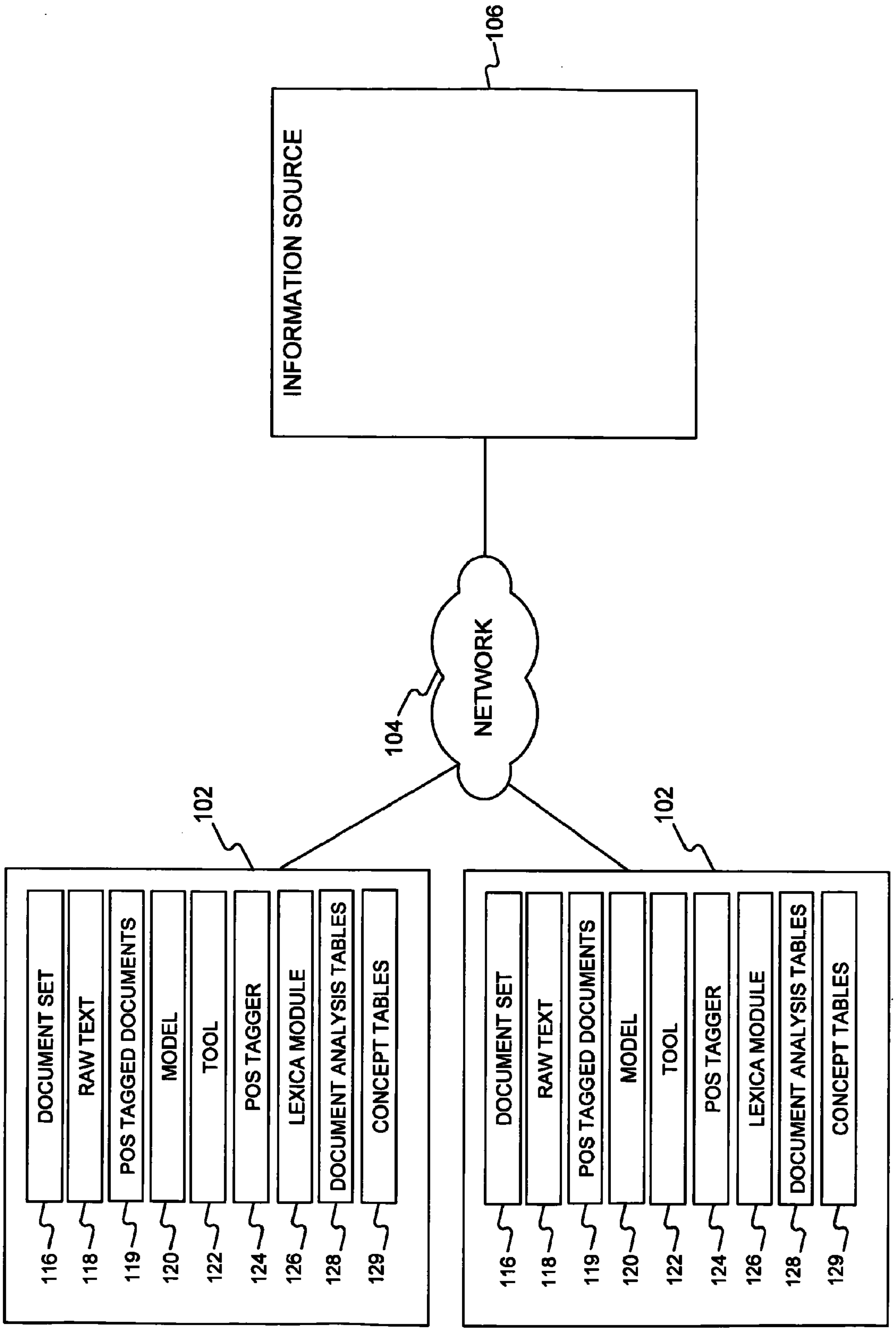
FIG. 1A is a diagram of the components in an exemplary information extraction and modeling system consistent with an embodiment of the present invention.

FIG. 1A is a diagram of the components in an exemplary information extraction and modeling system consistent with an embodiment of the present invention. In one embodiment, as shown in FIG. 1A, one or more computers (such as user stations 102) and at least one information source 106 are connected in a network configuration represented by a network cloud 104. Network 104 may be the Internet, a wide area network, a local area network, or any other conduit for communication of information between user stations 102 and information storage devices. In addition, the use of two user stations 102 is merely for illustration and does not limit the present invention to the use of a particular number of user stations. Similarly, any number of information sources 106 may be used consistent with the present invention.

Information source 106 is a search engine, web page, database (e.g., the United States National Library of Medicine PubMed®/MEDLINE® database), or other information. Document set 116 is a collection of text, abstracts, web pages, images, reports, excerpts from reports, computer files, or any other source that may be used to furnish information. Document set 116 may be created by a user, and the user may add documents or delete documents or portions of documents from document set 116 while using tool 122. Raw text 118 is a version of document set 116 that contains information from document set 116 in textual format or other format suitable as input to a POS Tagger 124. POS-tagged text 119 is a version of raw text 118 that has been processed and tagged with parts of speech. Model 120 is a structured computer-storable representation of information, such as things, concepts, actions, relations that may be found in document set 116, which may be presented to a user via a user interface display, such as the display described in greater detail below with respect to FIG. 111. Tool 122 is a software application that may run on a computing system described in greater detail below with respect to FIG. 1B.

POS tagger 124 is a software application that marks up words in a document with their corresponding parts of speech (POS) (for example, verb, noun, etc.) and is known in the art. Lexica Module 126 is a software application that provides a dictionary of words, concepts, or phrases that may be found in a document and is known in the art. Document analysis tables 128 are database tables or other data structures that store data relating to document set 116, such as parts of speech, concepts, relations, etc. Document analysis tables 128 may be used by tool 122 to automatically create an initial model 120 or by the user to manually modify model 120. Document analysis tables 128 are described in greater detail below with respect to FIGS. 18A through 18C. Concept tables 129 are database tables or other data structures that store concepts extracted from document set 116, and are described in greater detail below with respect to FIG. 19.

Figure 1B:
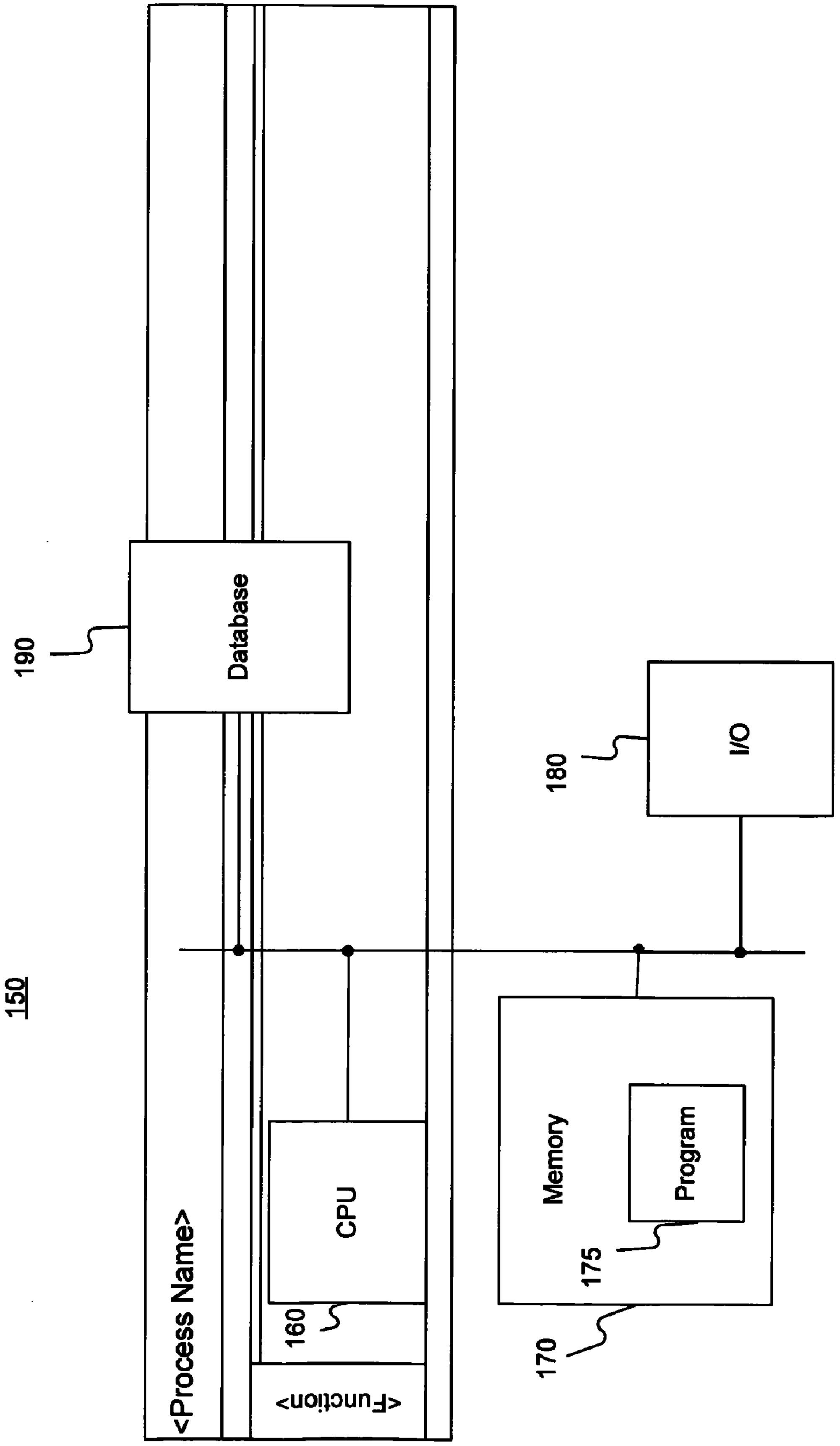
FIG. 1B is an exemplary computing system consistent with embodiments of the present invention.

FIG. 1B illustrates an exemplary computing system 150 consistent with embodiments of the invention. System 150 includes a number of components, such as a central processing unit (CPU) 160, a memory 170, an input/output (I/O) device(s) 180, and a database 190, which can be implemented in various ways. For example, an integrated platform (such as a workstation, personal computer, laptop, etc.) may comprise CPU 160, memory 170 and I/O devices 180. In such a configuration, components 160, 170, and 180 may connect through a local bus interface. Access to database 190 (implemented as a separate database system) may be facilitated through a direct communication link, a local area network (LAN), a wide area network (WAN) and/or other suitable connections. System 150 may be part of a larger information extraction and modeling system that networks several similar systems to perform processes and operations consistent with the invention. A skilled artisan will recognize many alternate configurations of system 150.

CPU 160 may be one or more known processing devices, such as a microprocessor from the Pentium™ family manufactured by Intel™. Memory 170 may be one or more storage devices configured to store information used by CPU 160 to perform certain functions related to embodiments of the present invention. Memory 170 may be a magnetic, semiconductor, tape, optical, or other type of storage device. In one embodiment consistent with the invention, memory 170 includes one or more programs 175 that, when executed by CPU 160, perform processes and operations consistent with the present invention. For example, memory 170 may include a program 175 that accepts and processes documents, or memory 170 may include a raw text analysis program 175, or memory 170 may include a modeling program 175, or an information extraction program 175.

Methods, systems, and articles of manufacture consistent with embodiments of the present invention are not limited to programs or computers configured to perform dedicated tasks. For example, memory 170 may be configured with a program 175 or tool 122 that performs several functions when executed by CPU 160. That is, memory 170 may include a program(s) 175 that perform extraction functions, textual analysis functions, POS tagger functions, graphing functions, and other functions, such as database functions that keep tables of concept and relation data. Alternatively, CPU 160 may execute one or more programs located remotely from system 150. For example, system 150 may access one or more remote programs that, when executed, perform functions related to embodiments of the present invention.

Memory 170 may be also be configured with an operating system (not shown) that performs several functions well known in the art when executed by CPU 160. By way of example, the operating system may be Microsoft Windows™, Unix™, Linux™, an Apple Computers operating system, Personal Digital Assistant operating system such as Microsoft CE™, or other operating system. The choice of operating system, and even to the use of an operating system, is not critical.

I/O device(s) 180 may comprise one or more input/output devices that allow data to be received and/or transmitted by system 150. For example, I/O device 180 may include one or more input devices, such as a keyboard, touch screen, mouse, scanner, communications port, and the like, that enable data to be input from a user. Further, I/O device 180 may include one or more output devices, such as a display screen, CRT monitor, LCD monitor, plasma display, printer, speaker devices, communications port, and the like, that enable data to be output or presented to a user. The configuration and number of input and/or output devices incorporated in I/O device 180 are not critical.

Database 190 may comprise one or more databases that store information and are accessed and/or managed through system 150. By way of example, database 190 may be an Oracle™ database, a Sybase™ database, or other relational database, or database 190 may be part of the system. Systems and methods of the present invention, however, are not limited to separate databases or even to the use of a database, as data can come from practically any source, such as the Internet and other organized collections of data.

Document set 116 may be created from information source 106 and stored at user station 102. Document set 116 may be stored locally, on a network accessible device, or on another computer. Using POS tagger 124, lexica module 126, and tool 122, a user may create one or more persistent, portable models 120 to retrieve information from document set 116, as described in more detail below.

Figure 2:
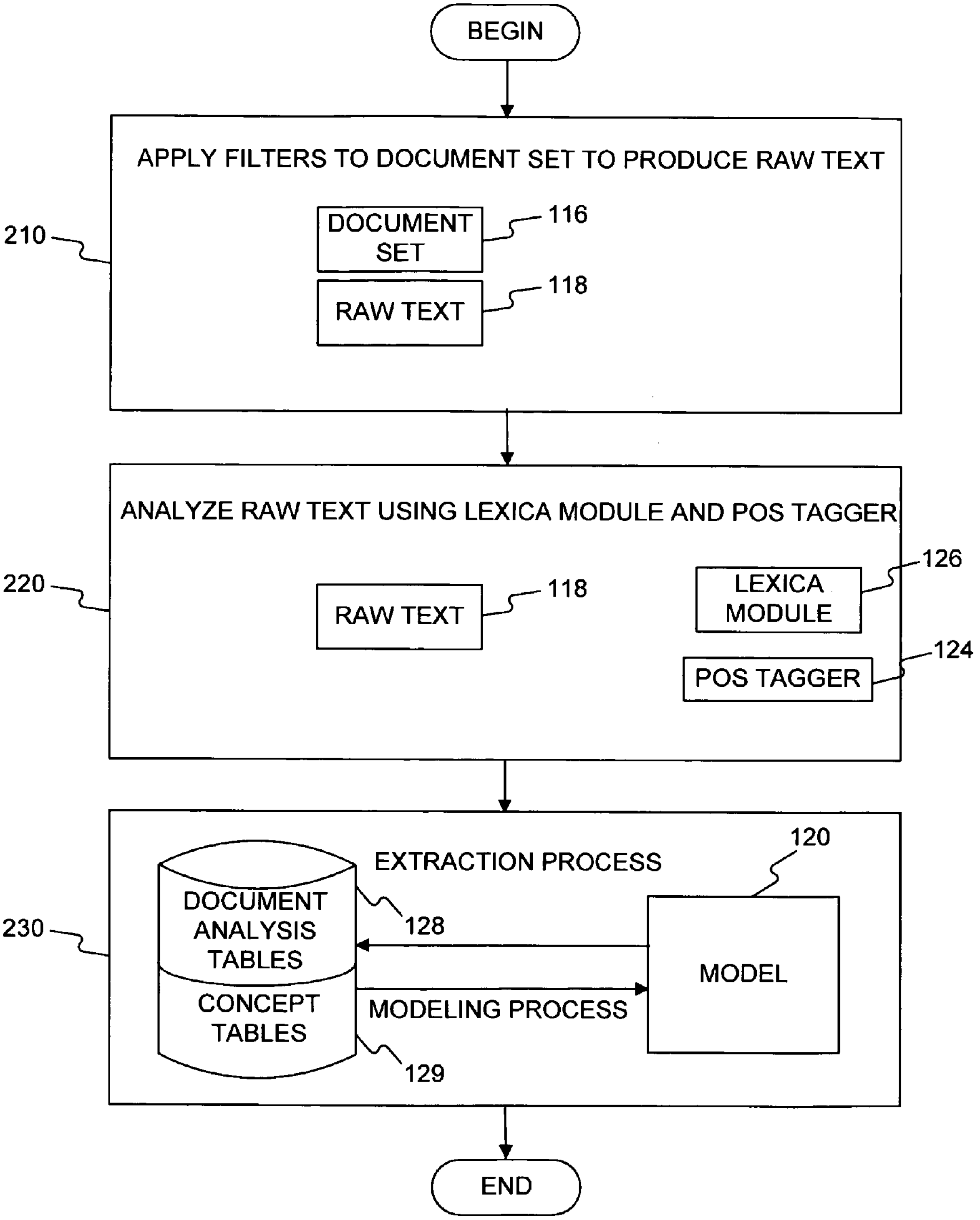
FIG. 2 is a flow diagram of exemplary steps performed by the system to extract and model information consistent with an embodiment of the present invention.

FIG. 2 is a flow diagram of exemplary steps performed by the system to extract and model information consistent with an embodiment of the present invention. A user may create model 120 by first applying filters to document set 116 (step 210) to produce raw text 118. A process for applying filters to document set 116 to produce raw text is described in greater detail below with respect to FIG. 3. Next, tool 122 may analyze raw text 118 (step 220), using, for example, lexica module 126 and POS tagger 124 known in the art, to produce document analysis tables 128 and POS-tagged documents 119. In one embodiment, customized lexica module 126 and POS tagger 124 may be applied to raw text 118 for tagging and lexical analysis. A process for raw text analysis is described in greater detail below with respect to FIG. 4. Next, an extraction process (step 230), described in greater detail below with respect to FIG. 5, may make use of the document analysis tables 128 to produce model 120.

Figure 3:
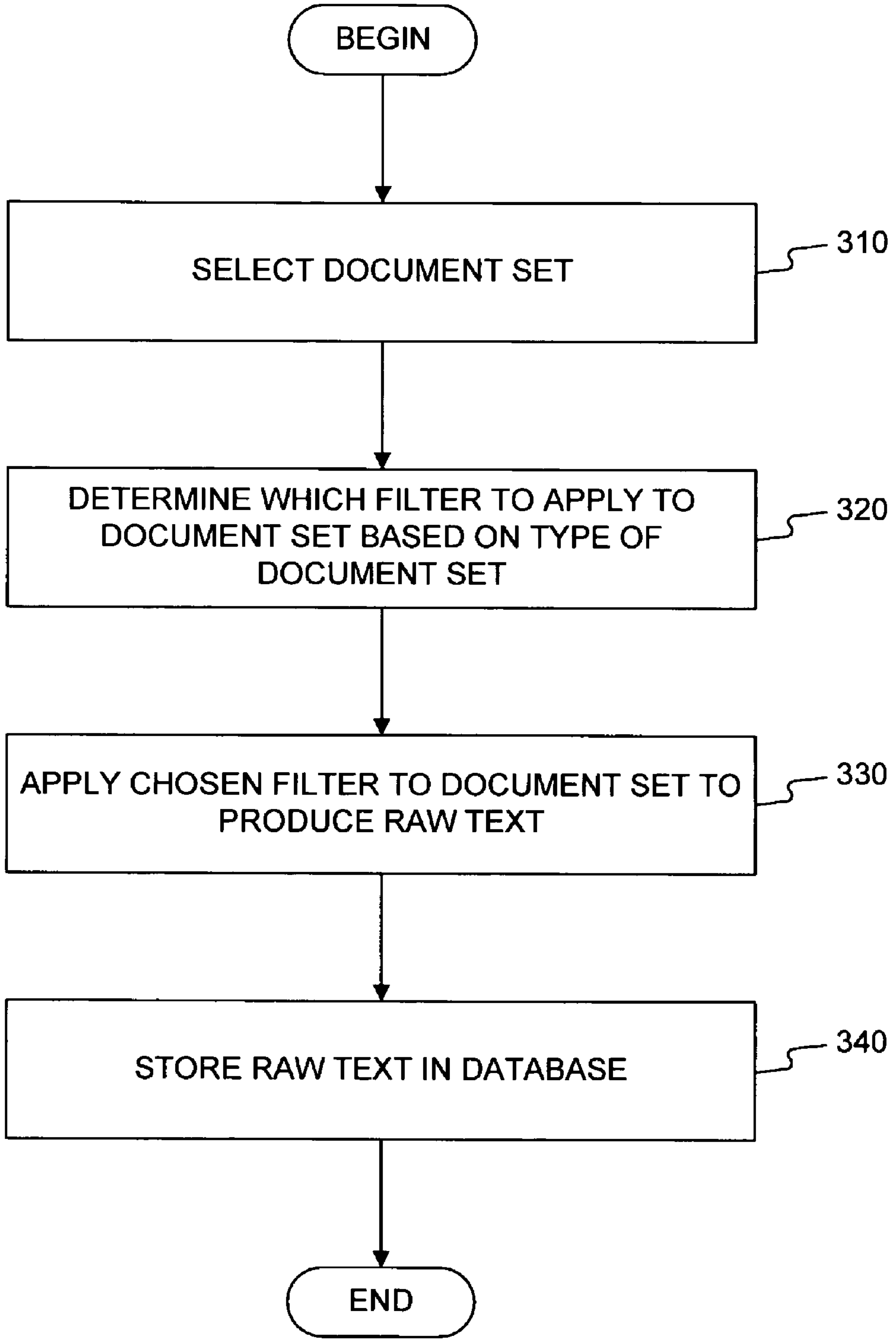
FIG. 3 is a flow diagram of exemplary steps performed by the system to produce raw text consistent with an embodiment of the present invention.

FIG. 3 is a flow diagram of exemplary steps performed by the system to produce raw text 118 consistent with an embodiment of the present invention. As shown in FIG. 3, a user may first select document set 116 for filtering (step 310). In one embodiment, the user may select document set 116 from a list of document sets stored at user station 102, using, for example, a user interface. In other embodiments, the user may download document set 116 from the Internet, or receive document set 116 from another user. In yet another embodiment, tool 122 may automatically select document set 116.

Tool 122 may then determine which filter to apply to document set 116 (step 320). In one embodiment, a user may select the filter, for example from a list of filters displayed in tool 122 or on the Internet. In other embodiments, tool 122 may automatically determine the appropriate filter based on the format or type of information in document set 116. For example, if documents in document set 116 are in PDF format, tool 122 may apply an appropriate PDF filter known in the art to produce raw text from the PDF documents in document set 116. In another example, if document set 116 is in HTML format, tool 122 may apply an appropriate filter known in the art to produce raw text from document set 116. Next, the chosen filter may be applied to produce raw text 118 (step 330), and raw text 118 may be stored, for example, locally in memory 170 at user station 102 (step 340). In certain embodiments, raw text 118 may be stored at a remote location accessible via network 104.

Figure 4:
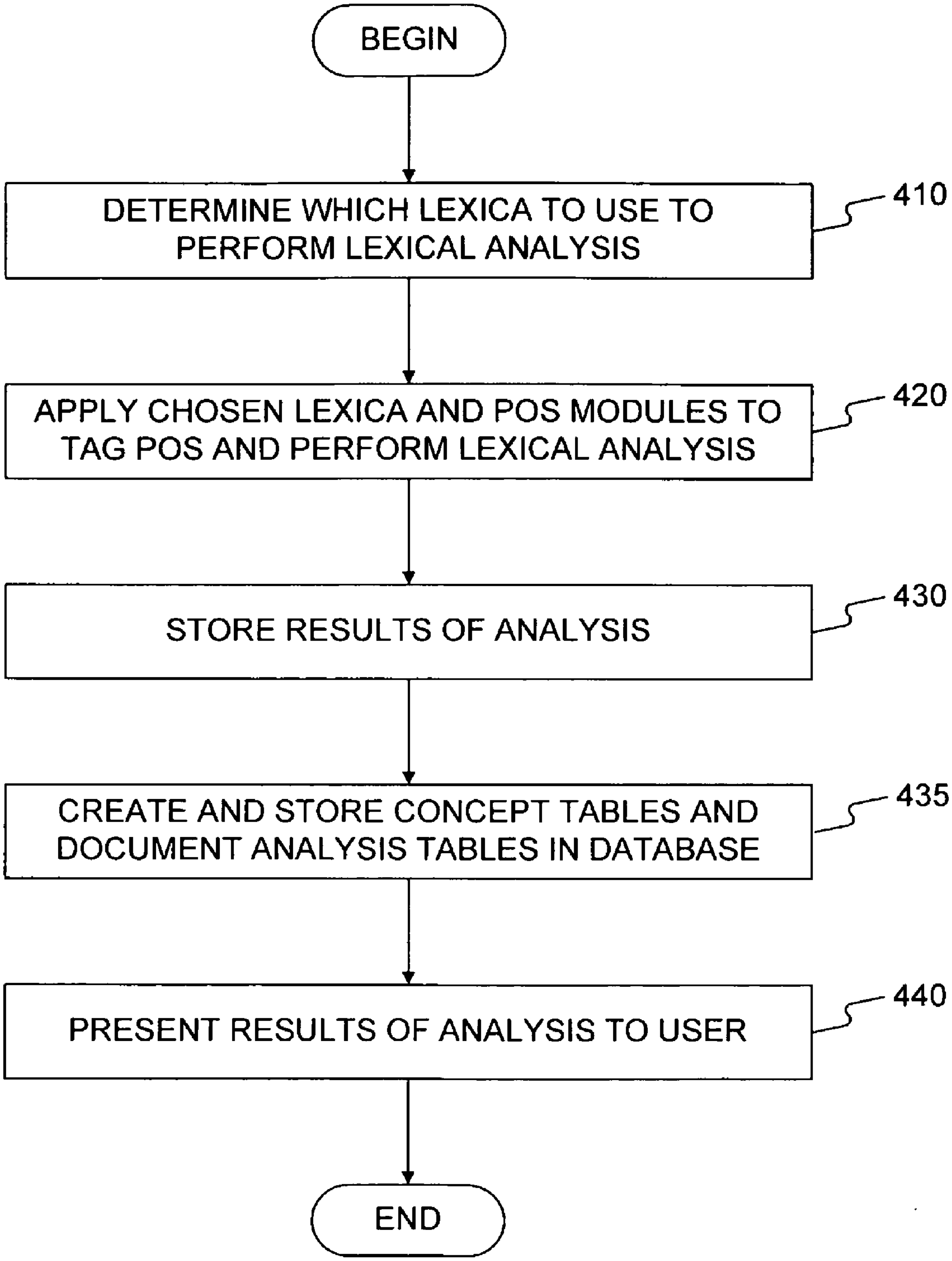
FIG. 4 is a flow diagram of exemplary steps performed by the system to analyze the raw text consistent with an embodiment of the present invention.

FIG. 4 illustrates an exemplary process for tagging and lexical analysis. In one embodiment, a user may determine which lexica module 126 to use to perform the lexical analysis on raw text 118 (step 410). In another embodiment, tool 122 may automatically determine which lexica module 126 to use. For example, tool 122 may analyze raw text 118 to determine that raw text 118 contains information about sports. Accordingly, tool 122 may select a lexica module related to sports to apply to raw text 118. A skilled artisan will appreciate that there are many other means and methods for selecting lexica module 126.

Tool 122 applies the chosen lexica module 126 and POS tagger 124 to raw text 118 so that POS tagging and lexical analysis may be performed (step 420). POS tagging identifies Words, phrases, clauses, and other grammatical structures in raw text 118 with their corresponding parts of speech (e.g., nouns, verbs, etc.). POS Xtagger 124 may be selected by a user, or may be automatically determined by tool 122.

During lexical analysis (step 420), tool 122 may analyze raw text 118 in a variety of ways. For example, tool 122 may determine frequently occurring n-grams (i.e., sub-sequences of n items from a given sequence of letters or words) in raw text 118, and may, in one embodiment, filter the frequently occurring n-grams to remove overlap. In another example, tool 122 may determine frequently occurring nouns, for example taking into account textual case, the number of nouns, and hyponyms, synonyms, and acronyms. Tool 122 may also find attributive noun phrase involving the frequently occurring nouns, and may find frequently occurring verb constructs, taking into account verb inflection, hypernyms, idioms, and troponyms. Tool 122 may also determine noun-preposition constructs in raw text 118.

After the raw text analysis is complete, tool 122 may store the results of the document analysis in document analysis tables 128 (step 430) and may automatically store concepts in concept tables 129 (step 435) to be used in the extraction process, described in more detail below with respect to FIGS. 5 and 19. In one embodiment, tool 122 may also mark raw text 118 to indicate where parts of speech, other grammatical constructs, or entities identified by lexical analysis occur in raw text 118 (not shown) to produce POS tagged documents 119. Finally, tool 122 may present the results of the raw text analysis to the user (step 440).

Figure 5:
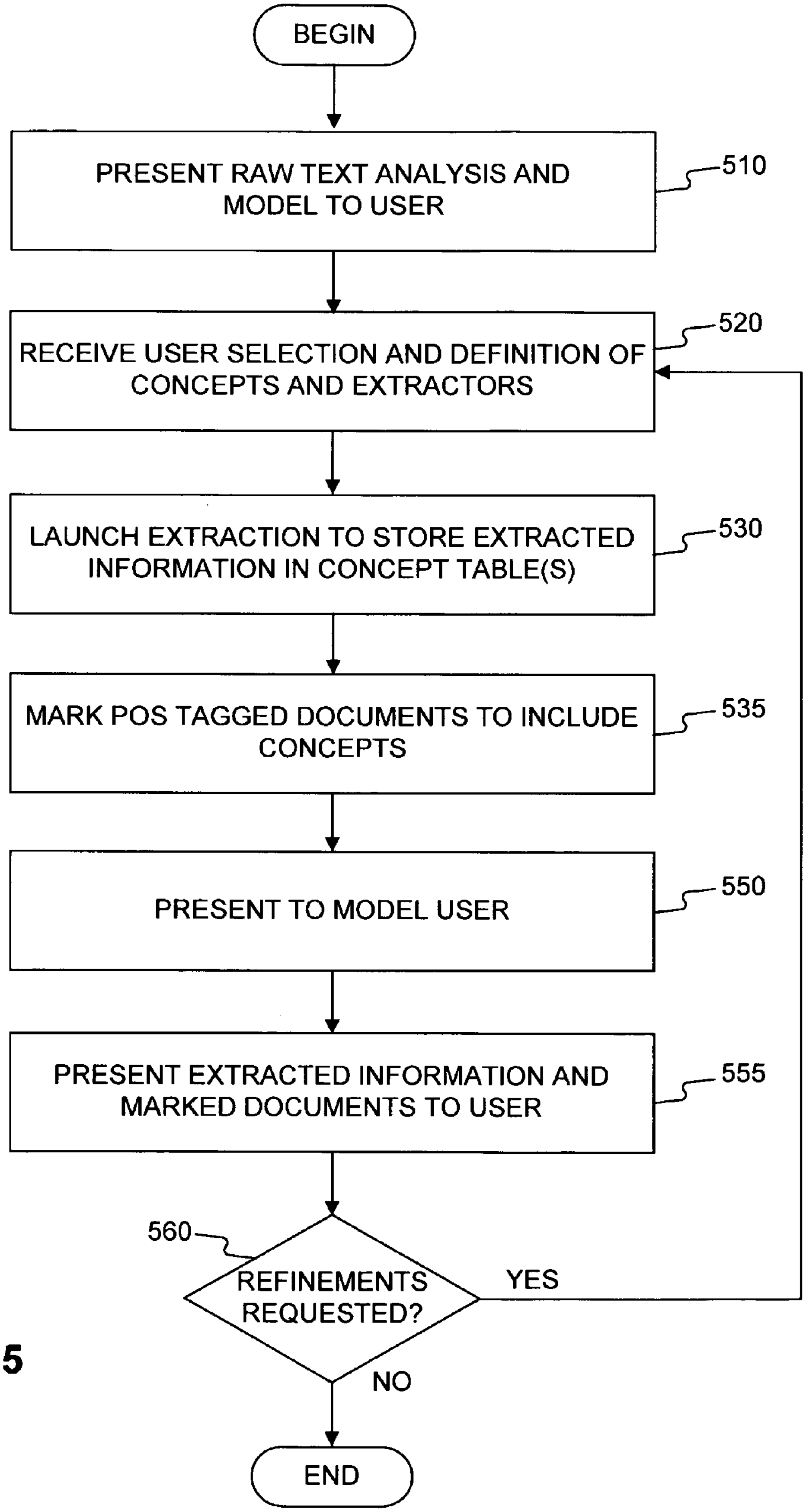
FIG. 5 is a flow diagram of exemplary steps performed by the system to extract and model information consistent with an embodiment of the present invention.

FIG. 5 illustrates an exemplary extraction process that begins when a user accesses the raw text analysis (step 510) produced by the process described with respect to FIG. 4 and a newly created model 120 or an existing model 120. Next, tool 122 may receive the user's selection and definition of concepts (step 520), described in greater detail below with respect to FIGS. 11 through 17. If the concepts defined in step 520 require new database tables 129, tool 122 modifies the database accordingly. The user may launch an extraction to store extracted concepts in concept tables 129 (step 530). Tool 122 marks POS tagged documents 119 to include concepts indicated by the user (step 535). Next, tool 122 presents extracted information and marked texts, and presents model 120 to the user (step 550), for example in a user interface display described below with respect to FIG. 11. If the user requests refinements (step 560), the process may loop back and continue the process.

Step 510: Present Raw Text Analysis to User

Figure 6:
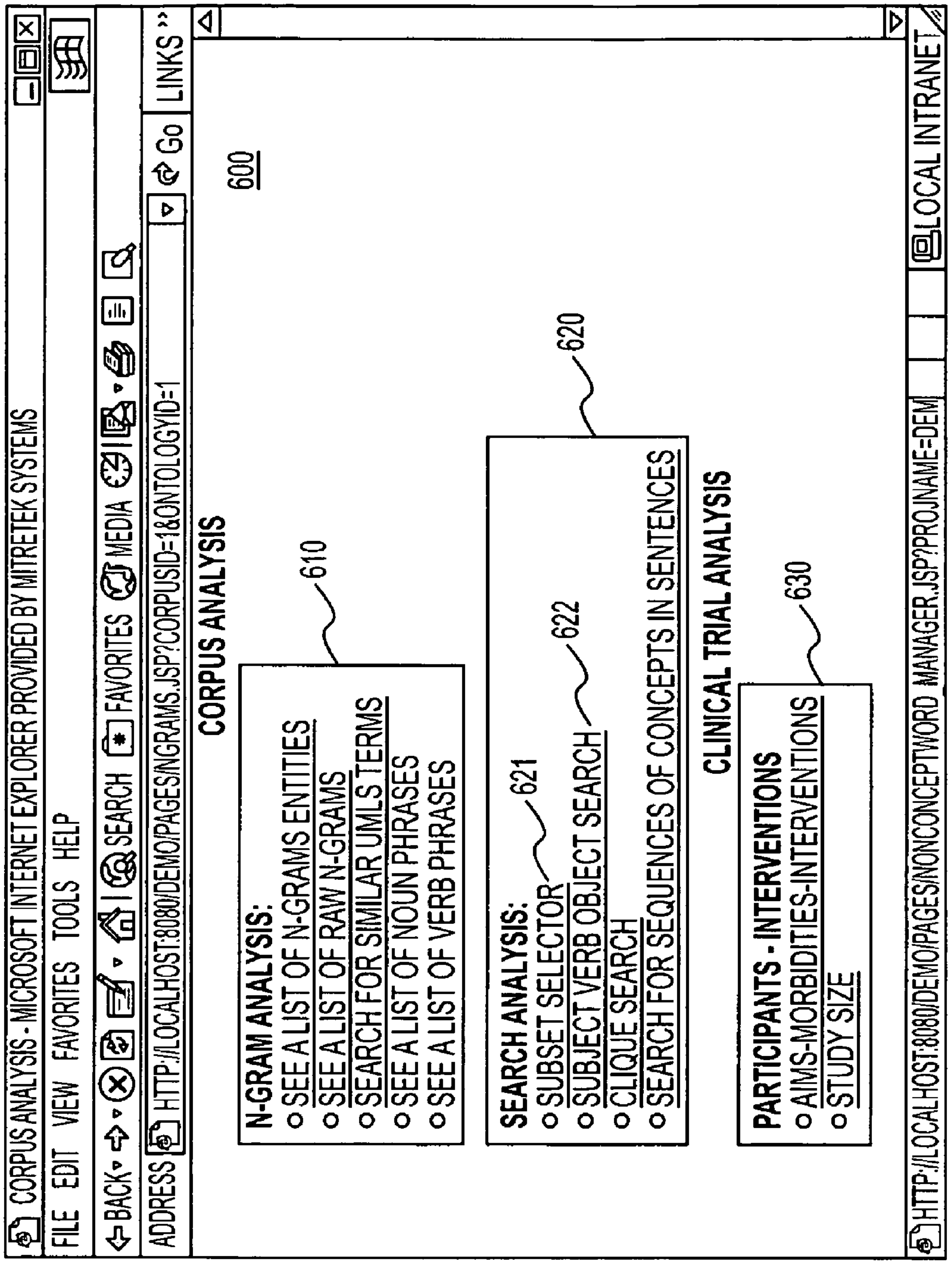

After completing the raw text analysis described above with reference to FIG. 4, tool 122 may present the results of the raw text analysis to the user (step 510). FIG. 6 illustrates an exemplary user interface display consistent with an embodiment of the present invention. Tool 122 may present menu 600 as shown in FIG. 6, which may provide the user with an overview of the informational content of document set 116 and the raw text analysis.

As shown in FIG. 6, menu 600 may present various options to the user, such as N-gram Analysis 610, Search Analysis 620, and Participants-Interventions 630. Each menu option may also contain various sub-options. One skilled in the art will recognize that menu options 610, 620, and 630 are merely for illustration, and that menu options may be added to, deleted from, or modified without departing from the principles of the invention.

Using tool 122 and menu 600, the user may access the most frequently occurring concepts or parts of speech (e.g., nouns, verbs, etc.) found in raw text 118 or in POS tagged documents 119, the frequency of the concepts or parts of speech, high-frequency trigger phrases, and other aspects of the structure and regularity of concepts, parts of speech, etc. In certain embodiments this information may be created by the processes described above in FIGS. 2-4. For example, as shown in FIG. 6, a user may see a list of n-grams entities, see a list of raw n-grams, search for similar terms, see a list of noun phrases, or see a list of verb phrases.

Figure 7:
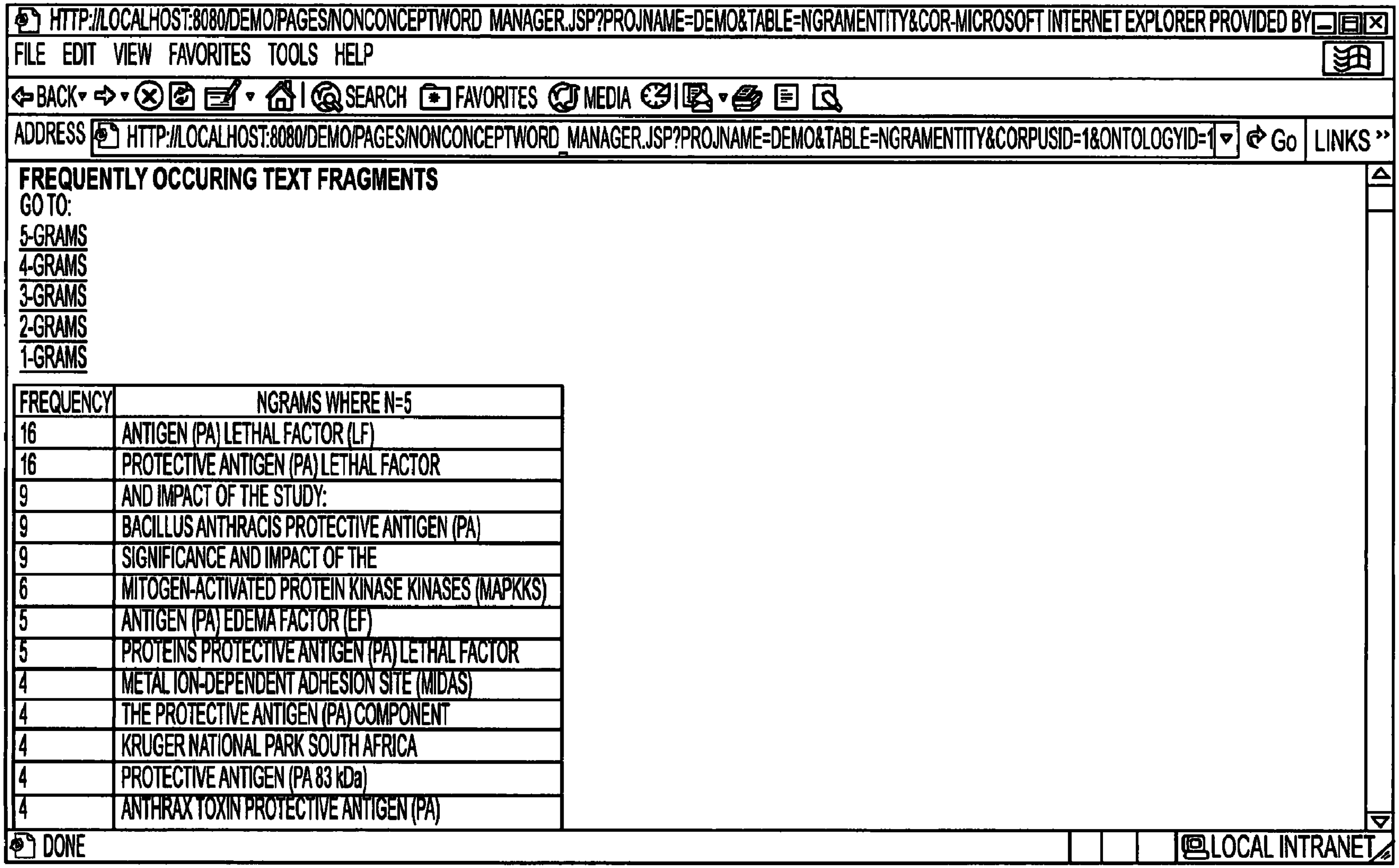

If the user selects "See a list of n-grams entities" from menu 600, tool 122 may display the list of n-grams entities to the user. FIG. 7 illustrates an exemplary user interface display of a list of n-grams that may be presented consistent with an embodiment of the present invention. As shown in FIG. 7, tool 122 may present frequently occurring n-grams, such as "5-grams," "4-grams," "3-grams," and their frequency, which may represent how often the n-grams occur in document set 116.

Searching Results of Raw Text Analysis

Figure 8:
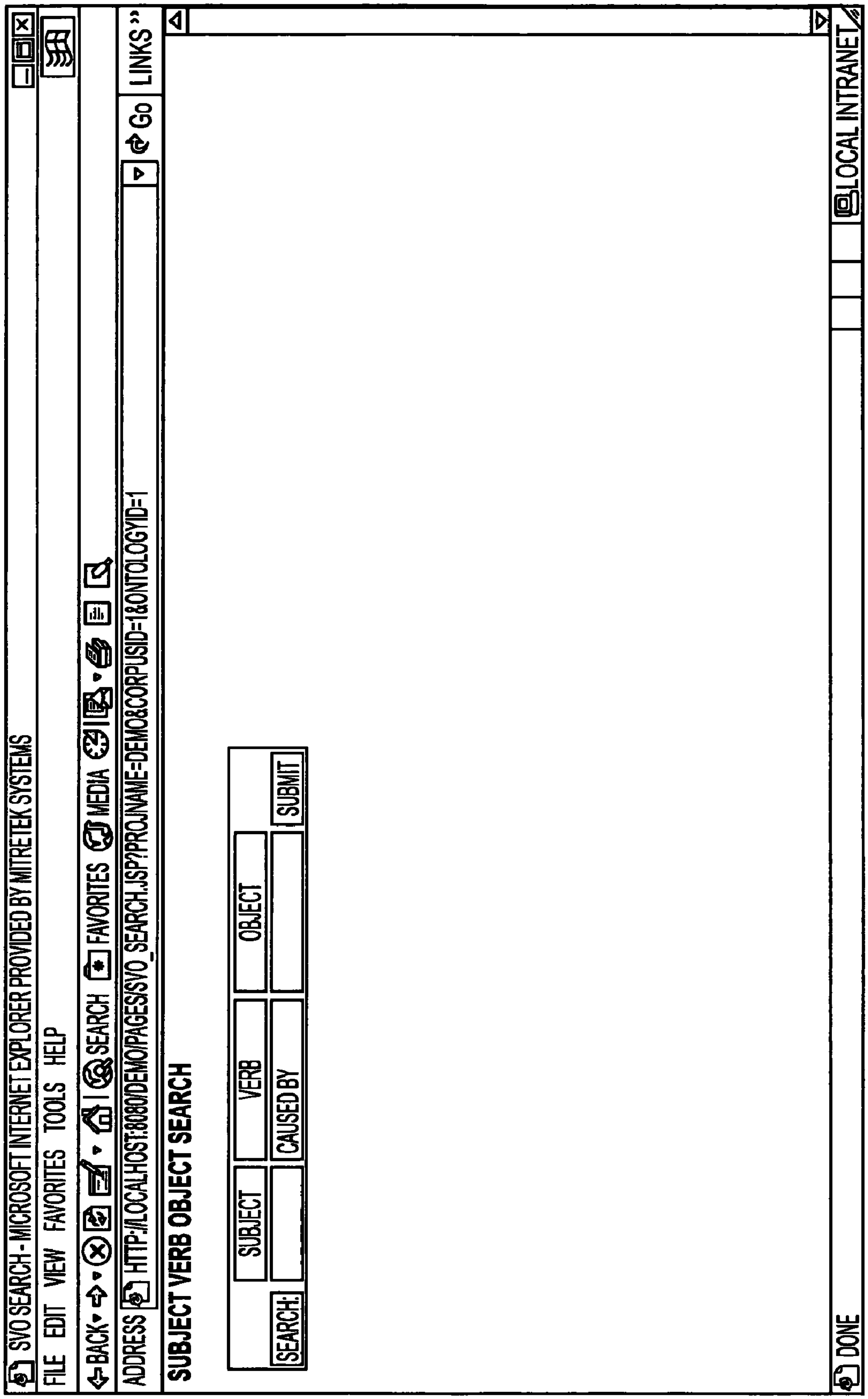

The user may also search the results of the raw text analysis. Returning to FIG. 6, for example, the user may select the option "Subject Verb Object Search" 622 from menu 600. Tool 122 may then display a user interface that allows a user to search document set 116, for example by providing a subject, verb, or object. FIG. 8 illustrates an exemplary user interface display consistent with an embodiment of the present invention that may allow a user to search document set 116 using a subject-verb-object search term. After receiving user input, for example the words "caused by" in the "verb" field of the search window in FIG. 8, tool 122 may search document set 116 to find all documents that include the verb "caused by." The user may input any verb in the "verb" field of the search window in FIG. 8, for example, "discovered in," "found," "retrieved," etc.

Tool 122 may find all documents in document set 116 with the requested verb and present the results to the user. FIG. 9 illustrates an exemplary user interface display consistent with an embodiment of the present invention that may display the results of a search to the user. In one embodiment, shown in FIG. 9, tool 122 may display the results of the "Subject Verb Object Search" in a user interface that separates the subject, verb, and object into separate data fields. In this way, the user may see an excerpt of each document that contains the requested verb and the related subject and object used in the document. If the user decides to view the document in more detail, the user may select a document, for example by selecting the link shown in the "DocID" data field of FIG. 9.

Removing Documents from Document Set

Figure 10:
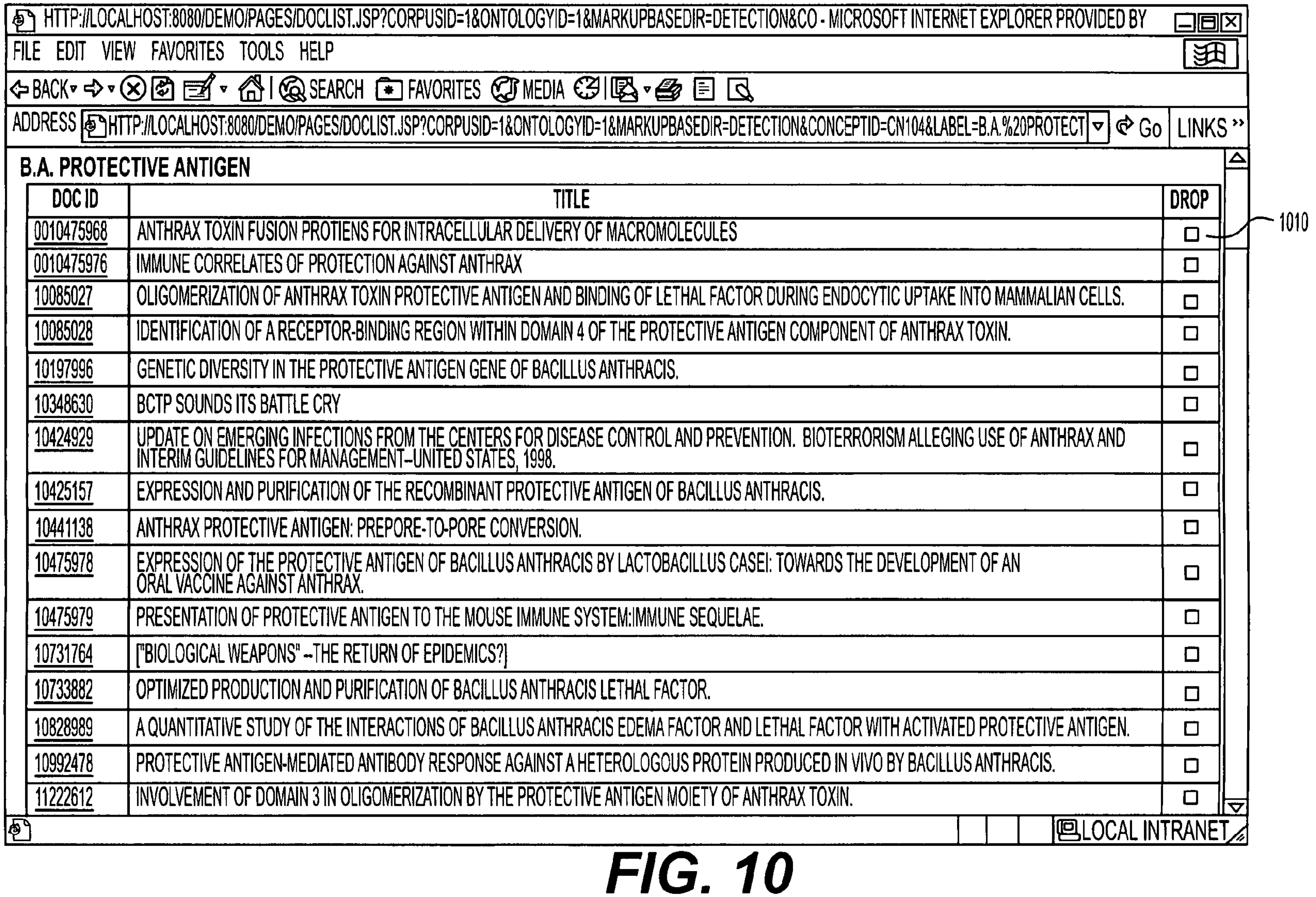

In one embodiment, a user may wish to add to, modify, or delete documents from document set 116. FIG. 10 is a user interface that the user may use to remove a document from document set 116, for example by clicking drop checkbox 1010 next to the document(s) to be removed.

Step 520: Receive User Selection of Entity Relations

Figure 11:
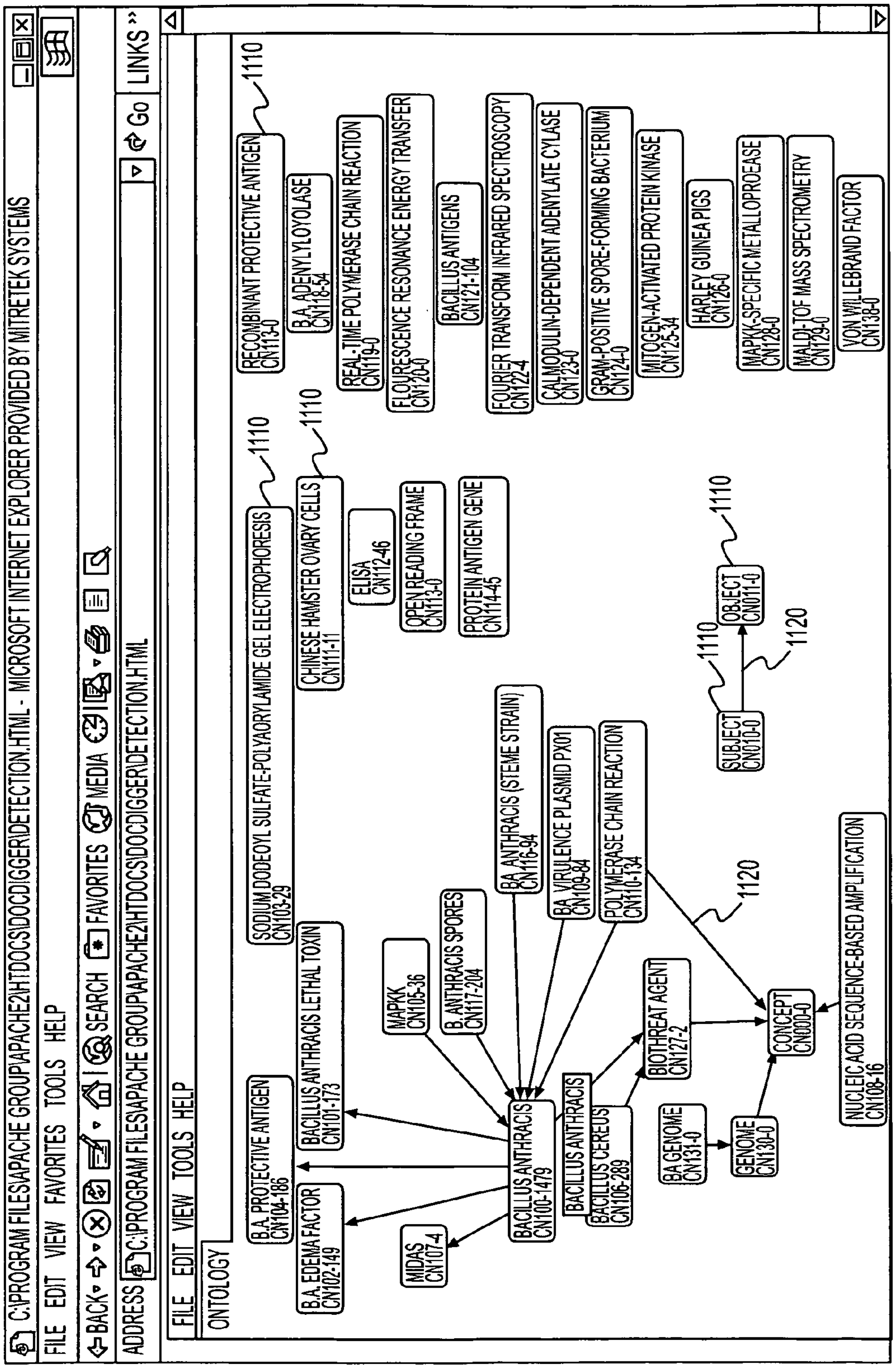

Instead of merely viewing lines of text, tool 122 may enable a user to create model 120 to view and analyze document set 116 graphically. For example, model 120 may use entity relationships input by the user so the user may view and modify a graph of the entity relationships in document set 116. FIG. 11 illustrates an exemplary user interface display consistent with an embodiment of the present invention that may display model 120. For example, as shown in FIG. 11, tool 122 may receive user input to create entities in model 120, such as nodes 1110 and relations 1120. Nodes 1110 and relations 1120 may represent concepts and relationships between concepts in document set 116. Nodes 1110 may include, for example, a concept such as a textual or graphical representation of information relevant to a user (e.g., the user may type in the term "recombinant protective antigen" to represent that concept). In one embodiment, model 120 may include one or more default nodes 1110 based on the results of raw text analysis, described above. Alternatively or additionally, the user may build nodes 1110. For example, the user may input the text to create a node representing a concept.

Figure 12:
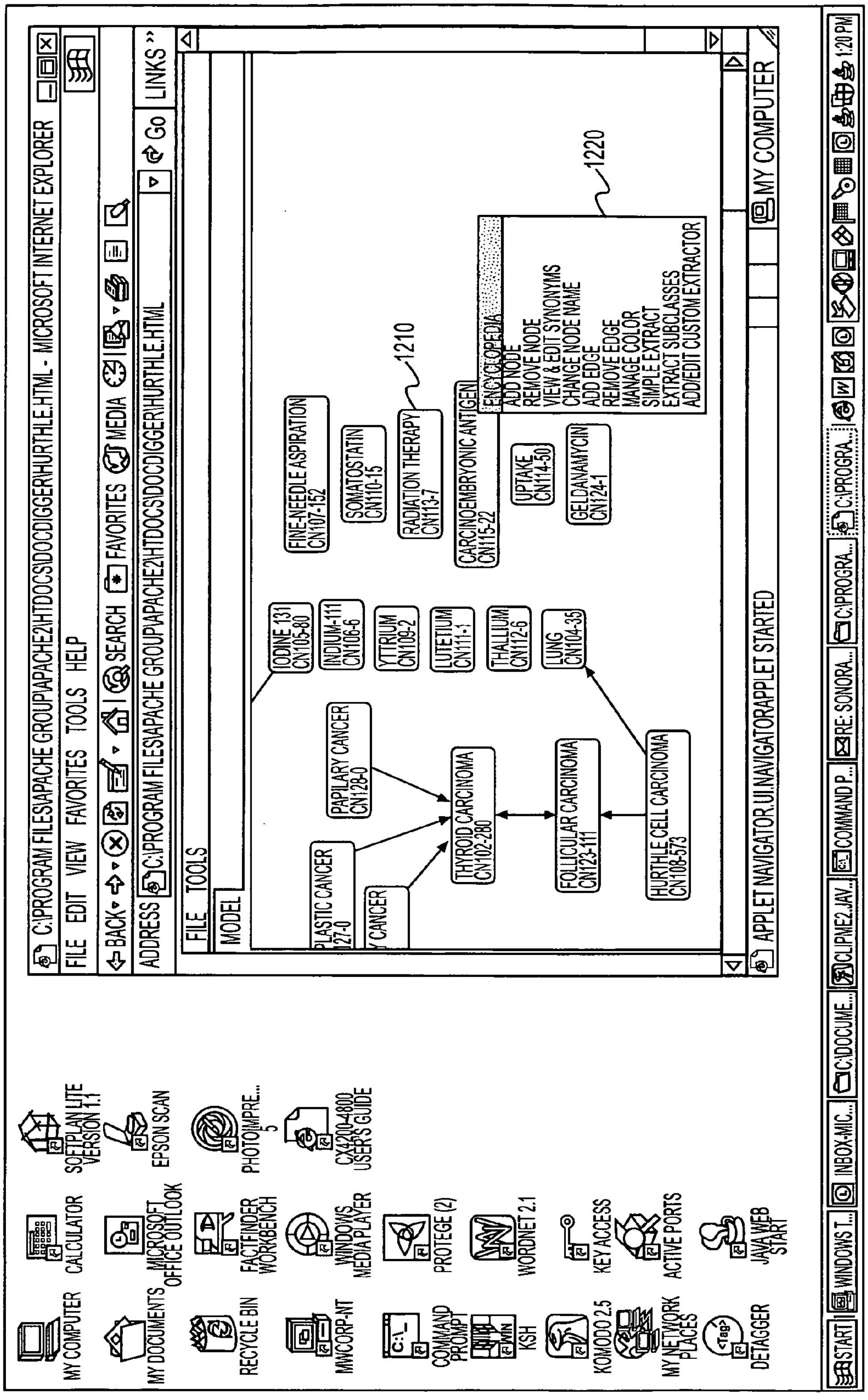

FIG. 12 illustrates an exemplary user interface display consistent with an embodiment of the present invention that may receive a user's input to create a node in model 120. A process for adding relations between nodes is described below with reference to FIG. 24. For example, as shown in FIG. 12, a user may create a node representing the concept "barium." The user may right click on model 120 or on any existing node, such as node 1210 "radiation therapy" to access a selection menu 1220, Selection menu 1220 may contain various options, such as "Encyclopedia," "Add Node," "Remove Node," "View & Edit Synonyms," "Change Node Name," "Add Edge," "Remove Edge," "Manage Color," "Simple Extract," "Extract Subclasses," and "Add/Edit Custom Extractor."

Figure 13:
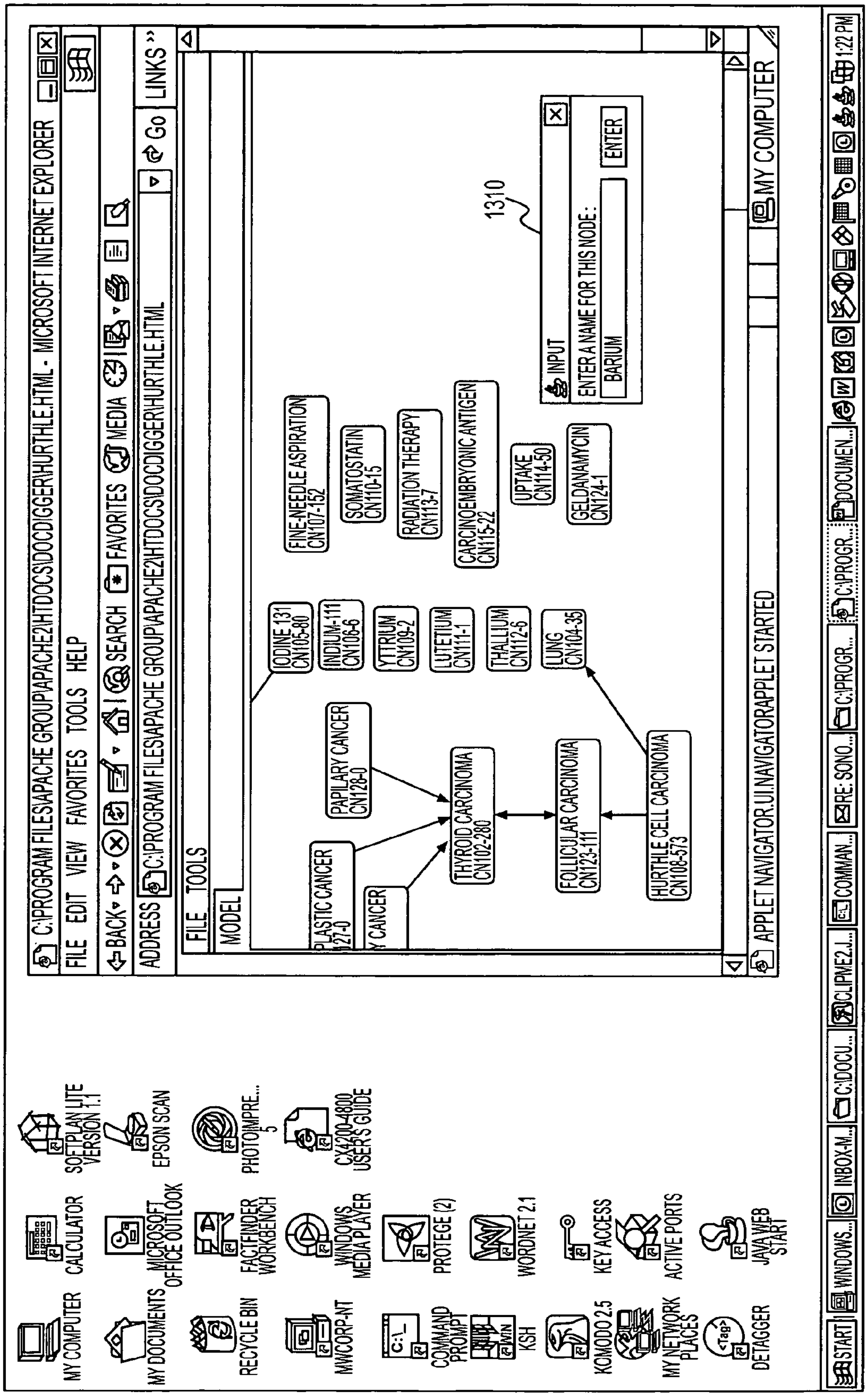
Figure 14:
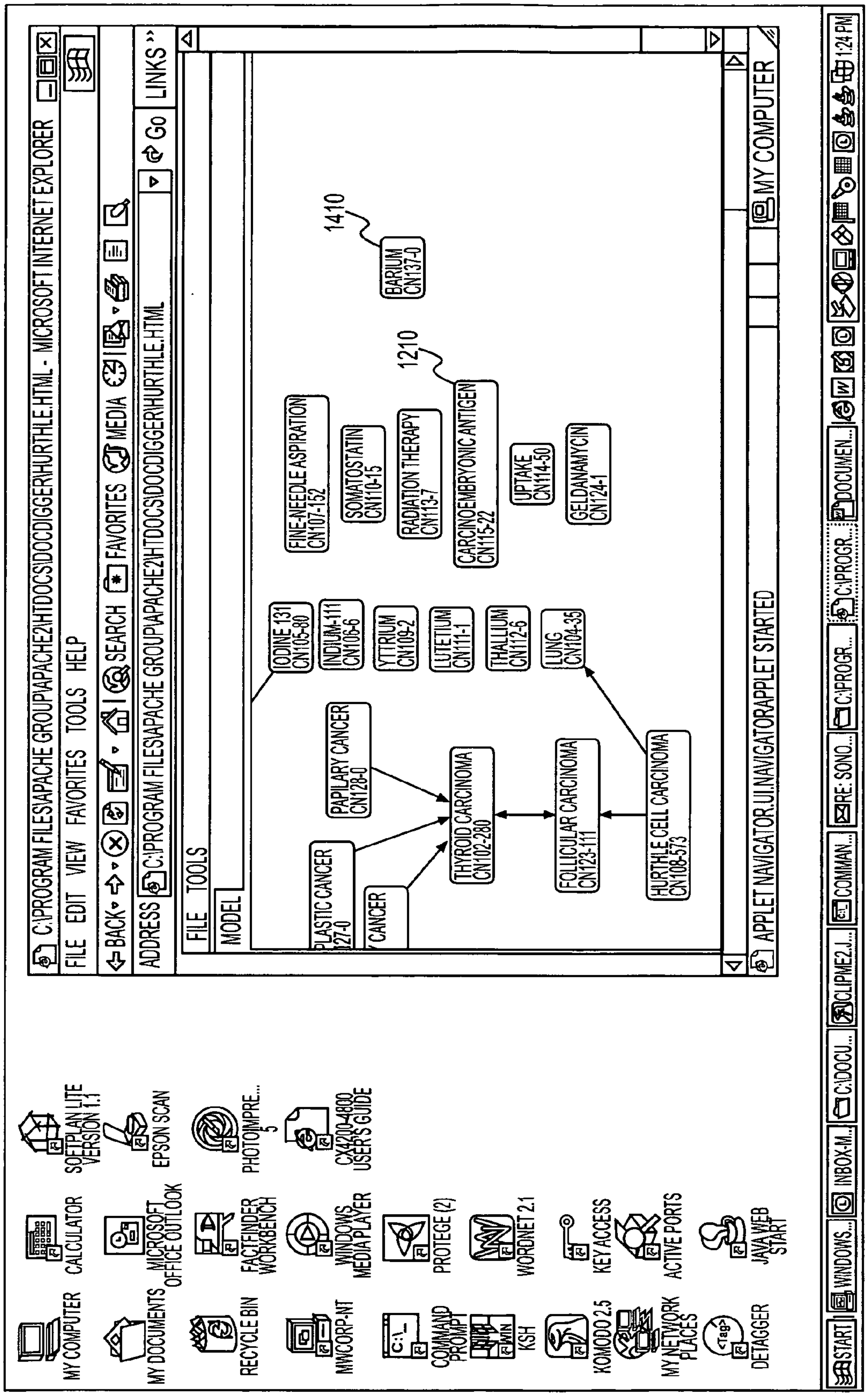

The user may select "Add Node" from selection menu 1220. FIG. 13 illustrates an exemplary user interface display consistent with an embodiment of the present invention that tool 122 may display after the user selects "Add Node." As shown in FIG. 13, tool 122 may display a popup window 1310 to the user. Using popup window 1310, a user may enter a concept that may be related to document set 116, such as "barium." FIG. 14 illustrates an exemplary user interface display consistent with an embodiment of the present invention that tool 122 may display to the user after the user creates a new node. As shown in FIG. 14, tool 122 adds new node 1410 "barium" to model 120. In one embodiment, node 1410 may also be assigned a concept number "CN137-0" which may be used by tool 122 to search document set and to associate nodes, relations, and synonyms.

Adding Synonyms

Figure 15:
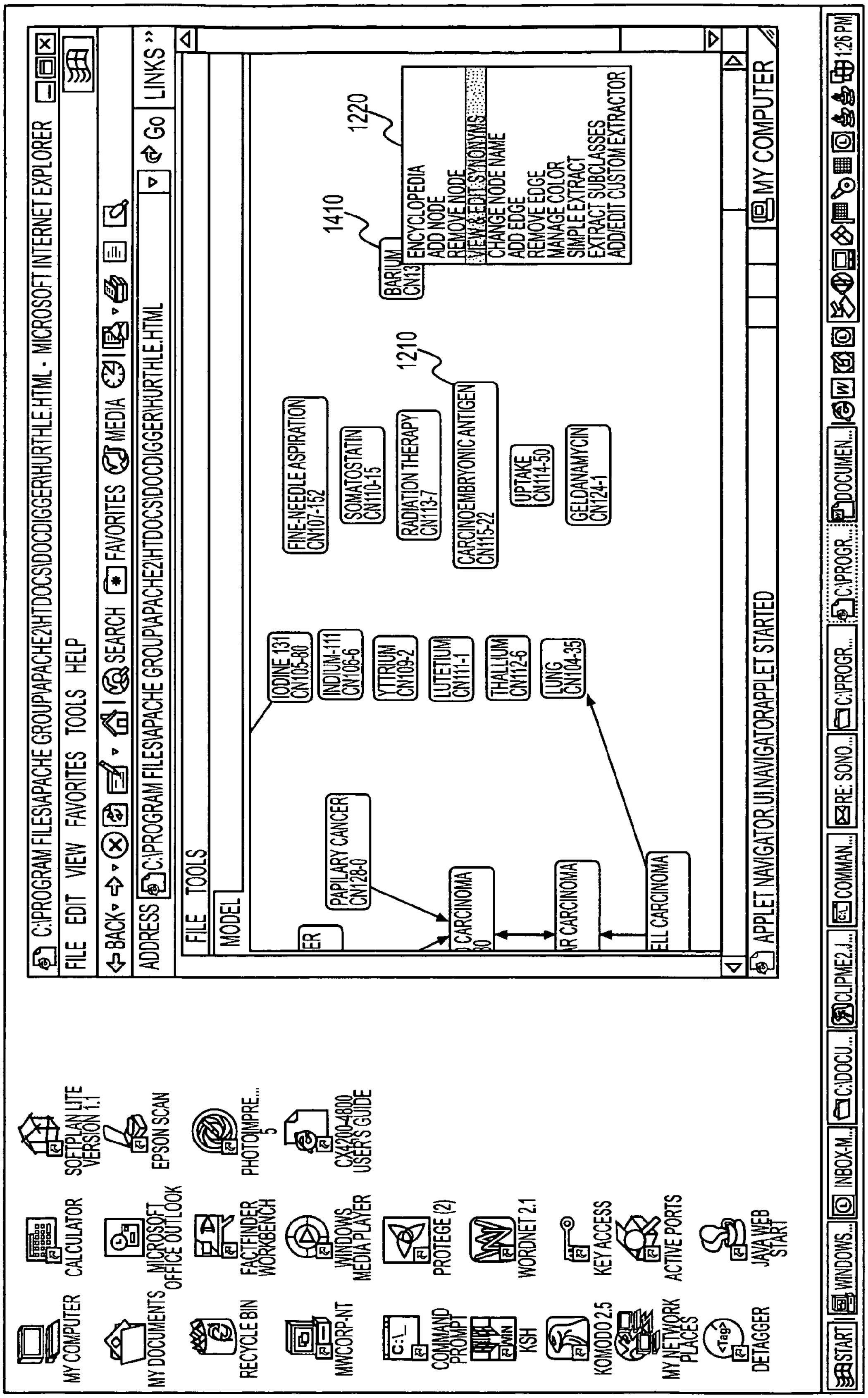

The user may also add synonyms, which may include textual fragments associated with one or more nodes. FIG. 15 is a user interface for viewing model 120. To add synonyms to a node, the user may right click on the desired node in model 120, for example node 1410 "barium," and tool 122 may display selection menu 1220. The user may then select "View & Edit Synonyms" from selection menu 1220.

Figure 16:
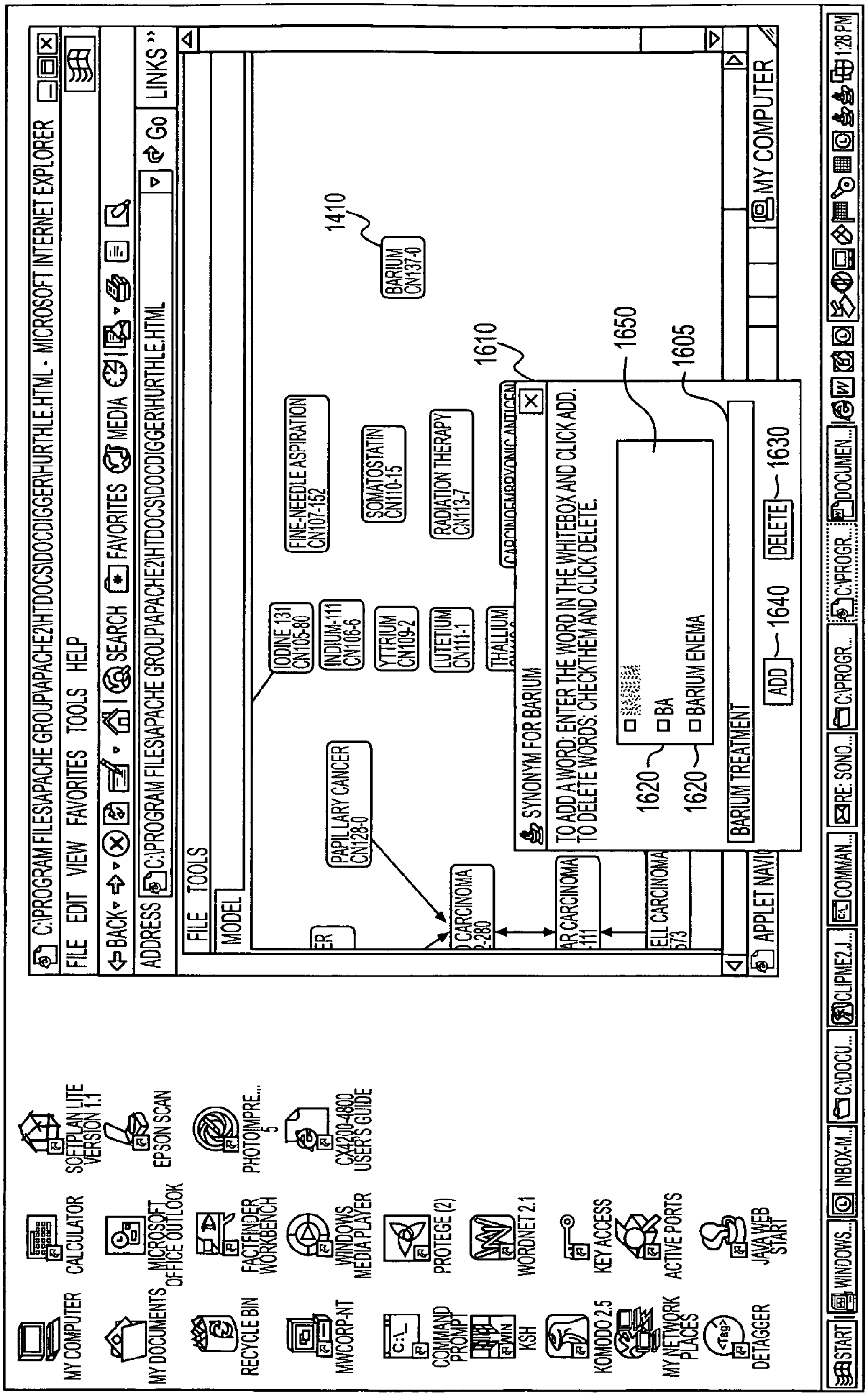

FIG. 16 is a user interface that displays a popup window 1610 for editing synonyms. The user may enter synonyms into text box 1605. After clicking "Add" button 1640, the synonyms will appear in the display box 1650. For example, a user may specify that "Ba," "barium enema," and "barium treatment" should be treated as synonymous references to the concept Barium. If a user wants to remove a synonym, the user may click checkbox 1620 next to the synonym and click delete box 1630. In one embodiment, tool 122 may accept multiple synonyms for each node. When the user is satisfied with the synonyms added to the node, the user may close popup window 1610. One skilled in the art will recognize that there are many other means and methods for accepting synonyms, such as receiving text in text boxes in the same user interface as model 120, accepting voice commands, receiving suggestions from an auxiliary data source such as a thesaurus, or highlighting or selecting words from a list.

After the synonyms are added to the node, tool 122 may retrieve all occurrences of each synonym in POS tagged documents 119, as described in greater detail below with respect to FIGS. 17-23.

Step 530: Launch Extraction

Figure 17:
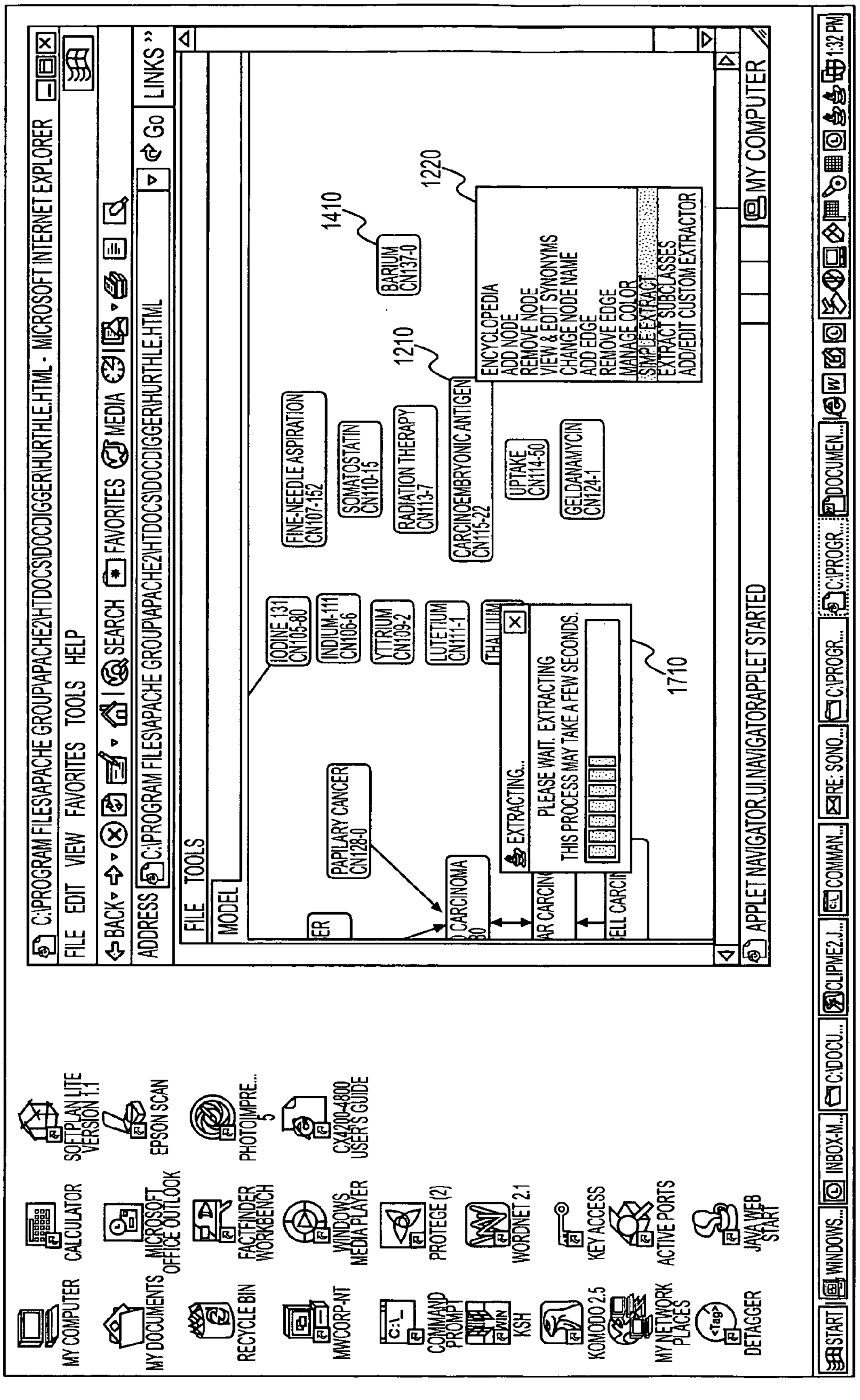

FIG. 17 is a sample user interface that may enable a user of tool 122 to extract and manipulate concepts from document set 116 using model 120. To extract information from document set 116 is to remove it from is original, natural language format. As described above with respect to FIG. 5, after creating or accessing model 120, a user may launch an extraction to construct or refine concept tables 129 or document analysis tables 128 (step 530). In one embodiment, the user may launch the extraction by selecting the "Simple Extract" option from selection menu 1220, as shown in FIG. 17. Tool 122 may display popup window 1710 to notify the user that the extraction is in progress.

In one embodiment, tool 122 may default to one extractor, but a user may add or edit an extractor, for example to create a more complicated extractor. The user may select "Add/Edit Custom Extractor" from selection menu 1220 to edit the default or existing extractor, or to add a new extractor. For example, the user may add extractors using existing commercial editors.

Next, concept tables 129 may be updated (step 530), for example to include any new or modified entities or relations. Tool 122 may also update document analysis tables 128 to indicate which documents include the concepts. In one embodiment, concept tables 129 and document analysis tables 128 may be stored locally in a database at user station 102. Alternatively, concept tables 129 and document analysis tables 128 may be stored remotely at any network accessible device. In one embodiment, concept tables 129 may be automatically generated to include an n-gram analysis of document set 116, before a user creates model 120.

FIG. 18A illustrates an exemplary document analysis table consistent with an embodiment of the present invention. As shown in FIG. 18A, document analysis tables 128 may store information extracted from raw text 118 created from document set 116. For example, document analysis tables 128 may store the location(s) in POS tagged documents 119 where a concept is located, such as the line number or sentence position of the concept. Document analysis tables 128 may also indicate which documents in document set 116 contain which concepts, as described in more detail below.

For example, as shown in FIG. 18A, document analysis tables 128 may include a document concept table 1810 that contains specific data extracted from document set 116. Document concept table 1810 may contain various data fields storing information, such as identifiers, types, concepts, or other data associated with document set 116, used in the processes described above. For example, table 1810, as shown in FIG. 18A, may contain a "Document ID" data field to store a document identifier (e.g., PubMed®/MEDLINE® identifiers.) Table 1810 may also contain a "ConceptID" data field to store a concept identifier for each node (for example, the identifier "C17102" may be assigned during model editing, as described in more detail below.)

A "sentbegin" data field may store an index of a first word in a sentence (i.e., if the $23^{rd}$ word of the file is the first word of the sentence, then the "sentbegin" field may store a data value of 23). A "sentend" data field may store an index for a final word of a sentence. A "CNbegin" data field may store an index of a first word of a text fragment representing a concept, and a "CNend" data field may store an index of a last word of a text fragment. The values in "CNbegin" data field and "CNend" data field may be equal if the text fragment includes only one word.

Other data fields may store other information used by the tool to create and modify models 120. For example, a "Corpus ID" data field may store a number assigned to a specific document set, an "OntologyID" data field may store a number assigned to a specific model 120, and a "status" data field may store other data. One skilled in the art will recognize that many other means and methods may be used to store information associated with document set 116.

Step 535: Mark POS Tagged Documents

When an extraction is launched, POS tagged documents 119 may be marked to include concepts represented by nodes 1110 (step 535). For example, indicators may be added to delineate concepts in POS tagged documents 119. In one embodiment, tool 122 searches POS tagged documents 119 to determine which documents include the requested concepts and relations defined in model 120, and designates the concepts and relations in POS tagged documents 119. For example, in one embodiment, POS tagged documents 119 may be stored such that each word in POS tagged documents

119 is stored in a separate line. In one embodiment, each word may be stored with an appropriate part of speech tag (e.g., noun, verb, pronoun). Tool 122 may add concept tags to the line to indicate the beginning of a concept, such as concept tag "C17102:" as shown in Table 1 below. To indicate the end of a concept, tool 122 may add a separate concept tag to the end of the line, such as ":C17102".

TABLE 1

| | | |
|---|---|---|
| C17102: | barium | :C17102 |
| CN200: | patient | :CN200 |

Tool 122 may mark multiple synonyms with the same concept tag to indicate that the synonyms represent the same concept. A synonym may include a concept chosen by a user, associated with or relating to a node. For example, a user may designate "person" as a synonym for "patient" while creating model 120. Tool 122 marks the words "patient" and "person" with the same concept indicators "CN200:" and ":CN200", as shown in Table 2, to represent that "person" and "patient" have been designated as synonyms.

TABLE 2

| | | |
|---|---|---|
| CN200: | patient | :CN200 |
| CN200: | person | :CN200 |

One skilled in the art will appreciate that many other means and methods may be used to add tags to POS tagged documents 119 to indicate concepts synonyms, relations, etc. For example, if POS tagged documents 119 are stored in XML format, standard tag-value pairs may be added at the appropriate places in the XML structure.

Figure 18C:
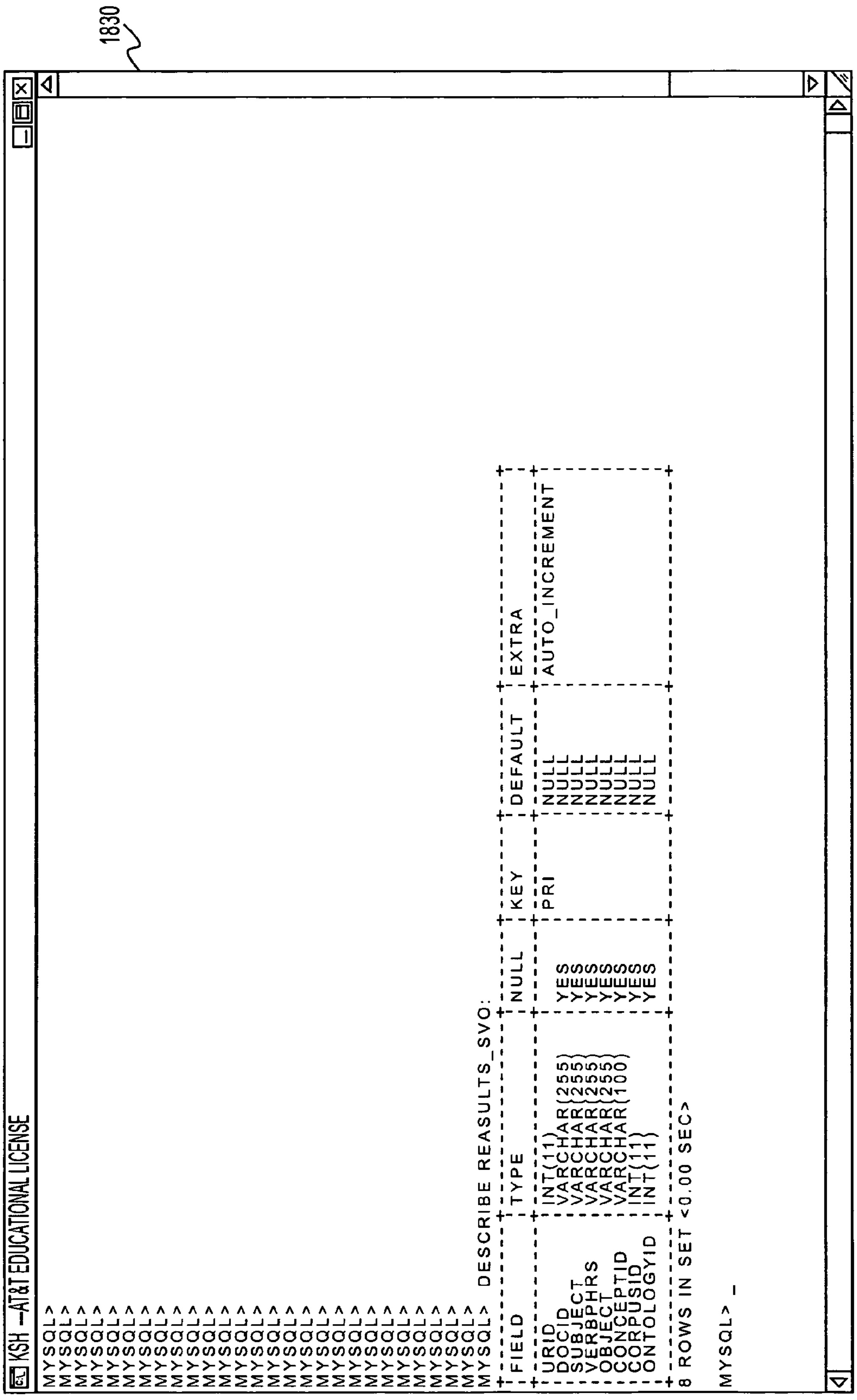

In one embodiment, information associated with the tags added to POS tagged documents 119 may be stored in document analysis tables 128. FIGS. 18B and 18C illustrate exemplary document analysis tables consistent with an embodiment of the present invention. As shown in FIG. 18B, document analysis tables 128 may include an n-gram analysis table 1820 to store concept tags and their related frequency within a particular document. A "urid" data field may store a unique row identification automatically assigned by the database, for example for bookkeeping purposes. A "corpusID" data field may store an identification assigned to a set of documents. A "n" data field may store the number of tokens in an n-gram, and a "count" data field may store the number of times that n-gram occurs in the whole corpus or document set. A "frag" data field may store the n-gram itself.

FIG. 18C illustrates a document result table 1830 including columns of the results of a "Subject Verb Object Search," described above with respect to FIG. 9. A "urid" data field may store a unique row identification automatically assigned by the database, for example for bookkeeping purposes. A "docid" data field may store an identification assigned to a document or set of documents. A "Subject" data field may store the subject of the sentence, for example as a text fragment. A "verbphrs" data field may store a verb phrase that sits between a subject and an object in the sentence, and may be stored as a text fragment. An "Object" data field may store the object of a sentence as a text fragment. A "conceptID" data field may store a concept identifier assigned to statements having the subject, verb, and object selected by a user from the "Subject Verb Object Search" described above with respect to FIG. 9. A "corpusID" data field may store the identifier of a corpus or document set, and an "ontologyID" data field may store an identifier of the model.

Concept Indicators

In one embodiment, a user may also assign adjustable indicators to concepts, for example by assigning adjustable colors to concepts. FIG. 19 illustrates an exemplary concept table consistent with an embodiment of the present invention. For example, concept table 1910 shown in FIG. 19 may store color types associated with various concepts. As shown in FIG. 19, concept table 1910 may contain a "cnuid" data field to store bookkeeping identifiers, such as document identifiers. A "cnid" data field may store a concept identifier, which may be assigned during creation of model 120, or after refining model 120, as described in more detail below. A "cnname" data field may store a placeholder identifier. A "descriptive" data field may store a preferred text fragment representing a given concept. A "colorstring" data field may store a hexadecimal encoding of colors that a user assigned to nodes. A "colorstatus" data field may indicate whether a user has turned a color on or off. An "ontologyID" data field may indicate the model 120 to which each concept belongs. In one embodiment, a single color table 1910 may store information for more than one model 120. In another embodiment, multiple concept tables 1910 may store information for various models 120.

Steps 550-555: Present the Model to User and Present Extracted Information and Marked Documents to User Next, tool 122 may present model 120 to the user (step 550), using, for example, a graphical user interface as shown in FIG. 11. Tool 122 may then present extracted information and marked documents to the user (step 555), as described in greater detail below with respect to FIGS. 20 through 29.

Step 560: Refinements

If a user wishes to refine model 120, the user may perform various actions to request refinements (step 560). For example, the user may add a node, relation, or synonym to model 120, as described below with respect to FIGS. 20-29.

Viewing and Refining Extracted Information

Figure 20:
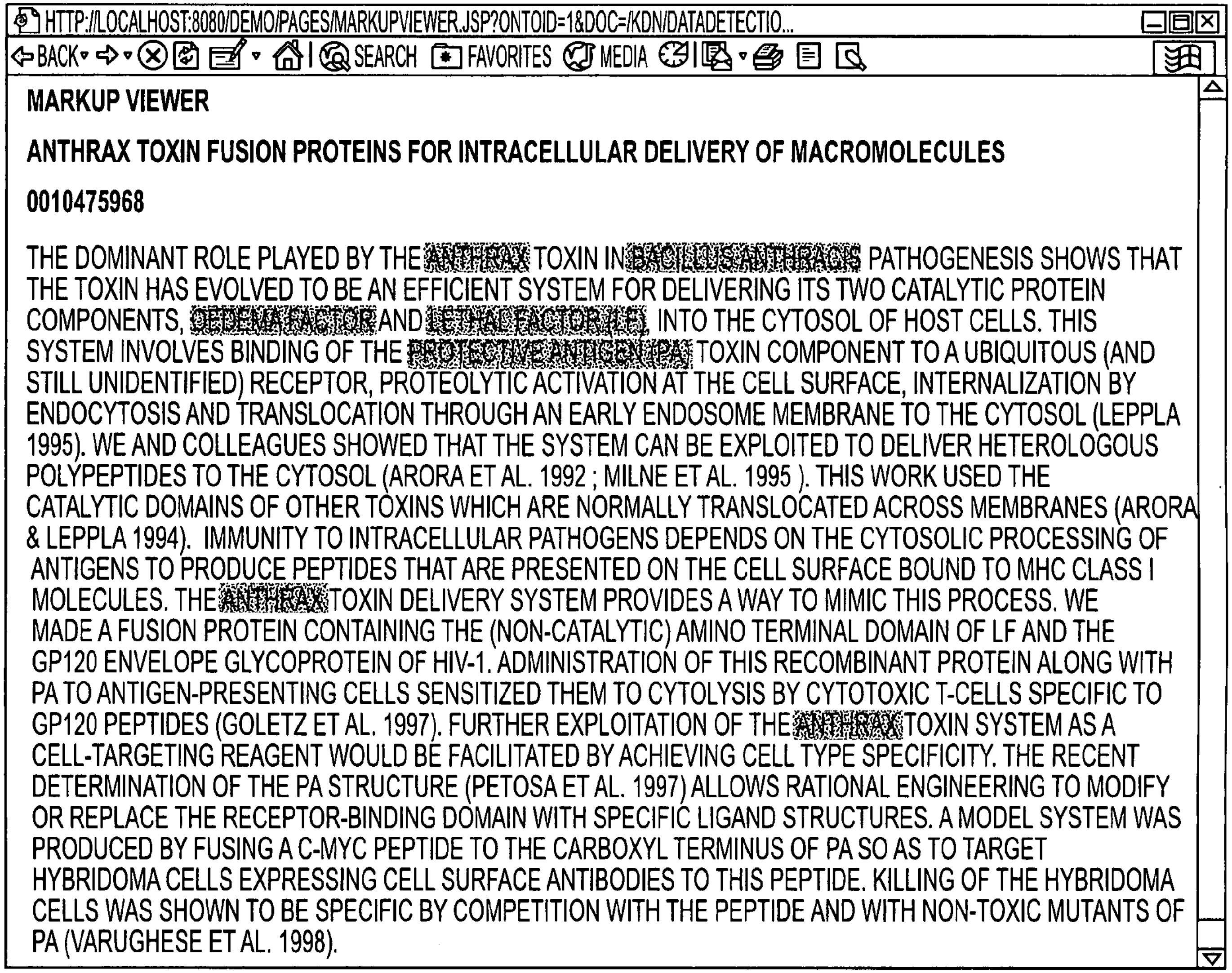
FIGS. 20-29 illustrate exemplary user interface displays consistent with an embodiment of the present invention.

FIG. 20 illustrates a user interface consistent with an embodiment of the present invention that displays information extracted from document set 116. As described above with respect to FIG. 19, tool 122 may highlight or otherwise mark words, combinations of words, images, and other symbols, with adjustable indicators, for example with colors, underlining, font changes, etc., to represent each concept and relation. The adjustable indicators may be displayed along with the concepts defined by the nodes in model 120 to indicate to the user where the concepts are located in a document. In one embodiment, different indicators may be assigned to each node.

As described above with respect to FIG. 19, the indicators may be adjustable. For example, in one embodiment, a user may click on a node or relation, and using selection menu 1220, may select "Manage Color", for example, to change the color or indicator corresponding to each node.

Refining Requested Concepts

Figure 21:
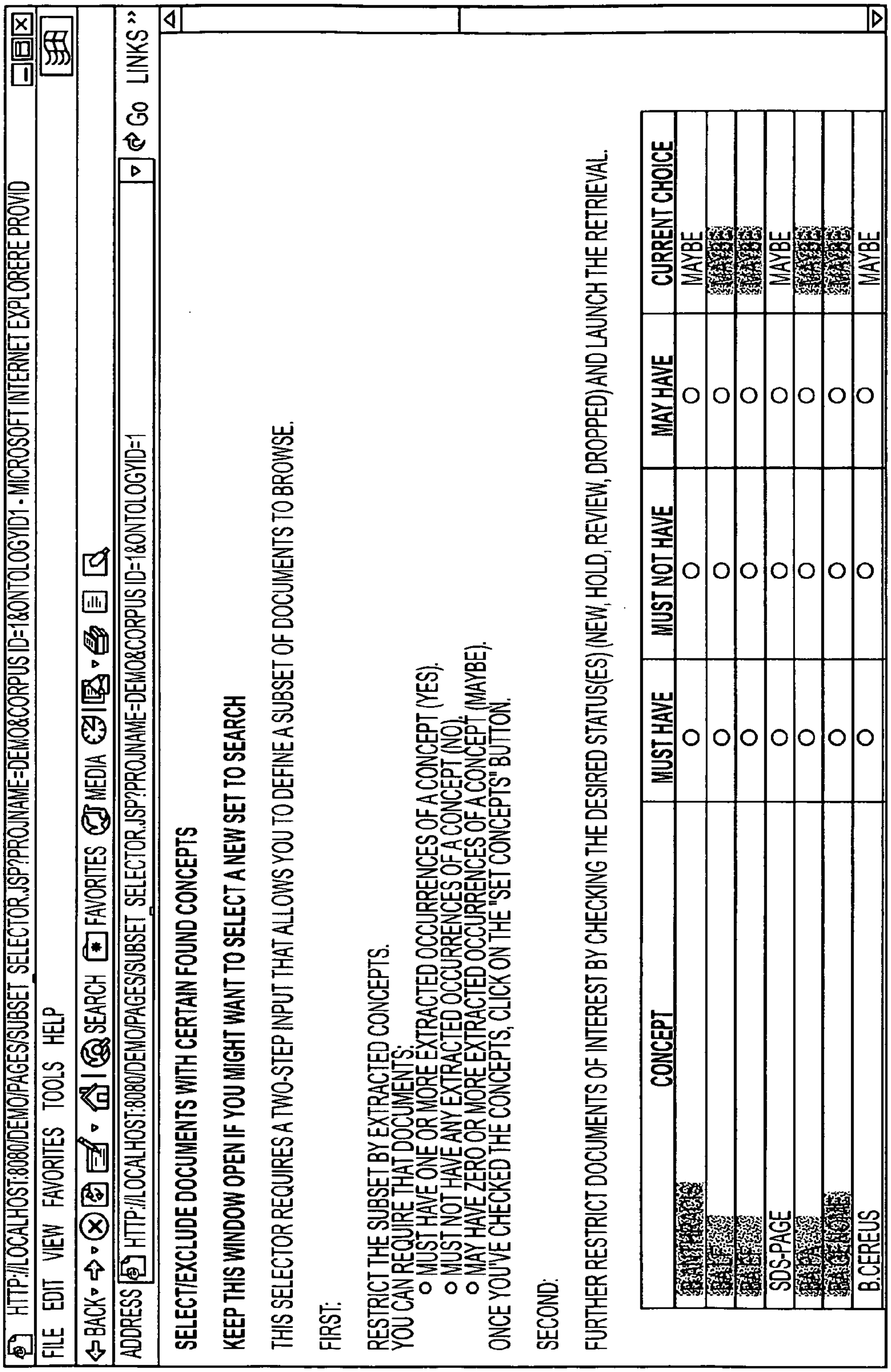

In yet another embodiment, a user may further refine the concepts and relations to be extracted from document set 116. FIG. 21 illustrates a user interface consistent with an embodiment of the present invention that a user may access to select or exclude documents with certain concepts. For example, as shown in FIG. 21, a user may select multiple concepts from the concepts in model 120 and choose a corresponding status, such as: "Must Have," "Must Not Have," or "May Have," and then submit this request to tool 122. Tool 122 uses the concept tables 129 and document analysis tables 128 to determine which documents contain or do not contain the concepts according to the user's choices, and displays the determined subset to a user in a user interface.

Figure 22:
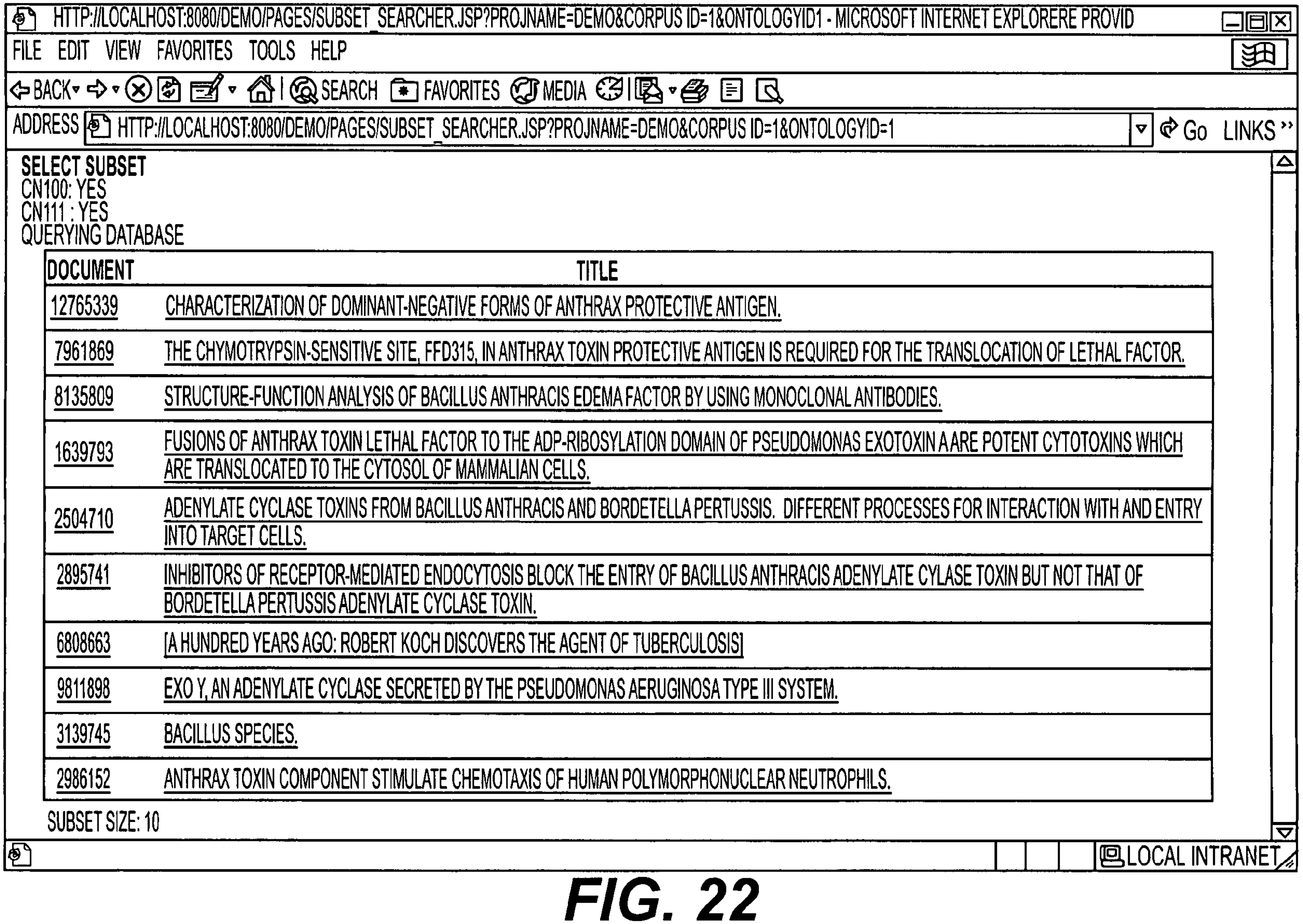

FIG. 22 illustrates a user interface consistent with an embodiment of the present invention that displays the result of the search from FIG. 21. Tool 122 may display the documents from document set 116 that have the requested concepts, e.g., using concept names or numbers, and statuses indicated by the user's search. Tool 122 may also display the concepts requested, the document identification number, the document title, and the number of documents returned by the search, as shown in FIG. 22.

Viewing Marked Documents

Figure 23:
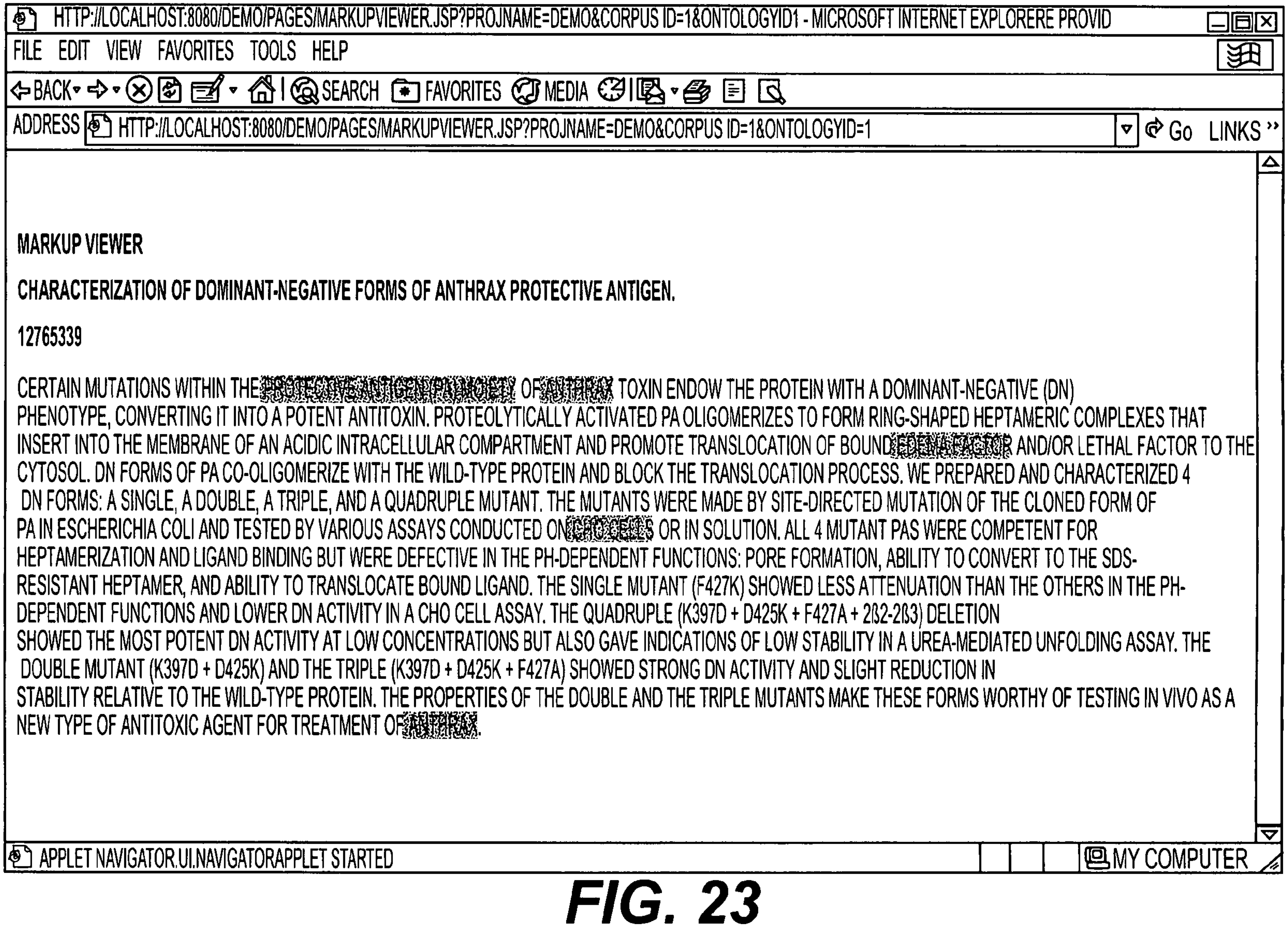

The user may select any document from the list in FIG. 22 to view the document and its marked up text in more detail. FIG. 23 illustrates an exemplary user interface display consistent with an embodiment of the present invention that tool 122 may use to display a document and its marked up text. As shown in FIG. 23, the concept "anthrax" is highlighted throughout the document. The concepts "protective antigen (PA) moiety," "CHO cells," and "edema factor" are also highlighted, and may be highlighted with different, adjustable colors. The adjustable colors may be associated with the nodes from model 120 that are related to each concept, as described above with respect to FIGS. 19-20.

Adding Relations

Figure 24:
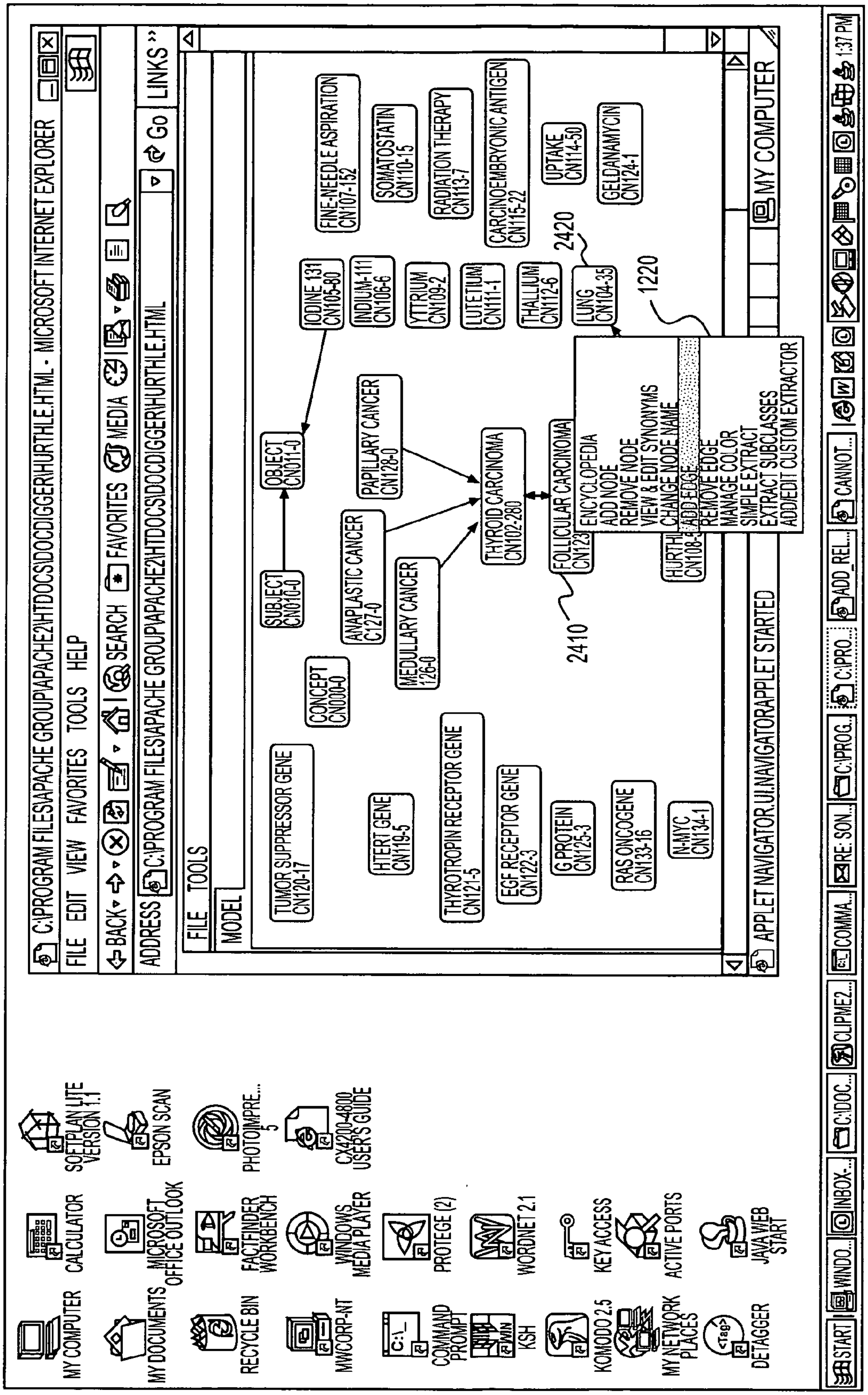

A user may wish to further refine model 120 by adding relations between the concepts in model 120. A relation may represent that certain concepts are connected in some way. FIG. 24 illustrates an exemplary user interface display consistent with an embodiment of the present invention that includes model 120. As shown in FIG. 24, to add a relation or "edge" between two nodes, (e.g., to represent the fact that "hurthle cell carcinoma" is found in a "lung"), a user may right click on the node "hurthle cell carcinoma" 2410 and select "Add Edge" from selection menu 1220.

Figure 25:
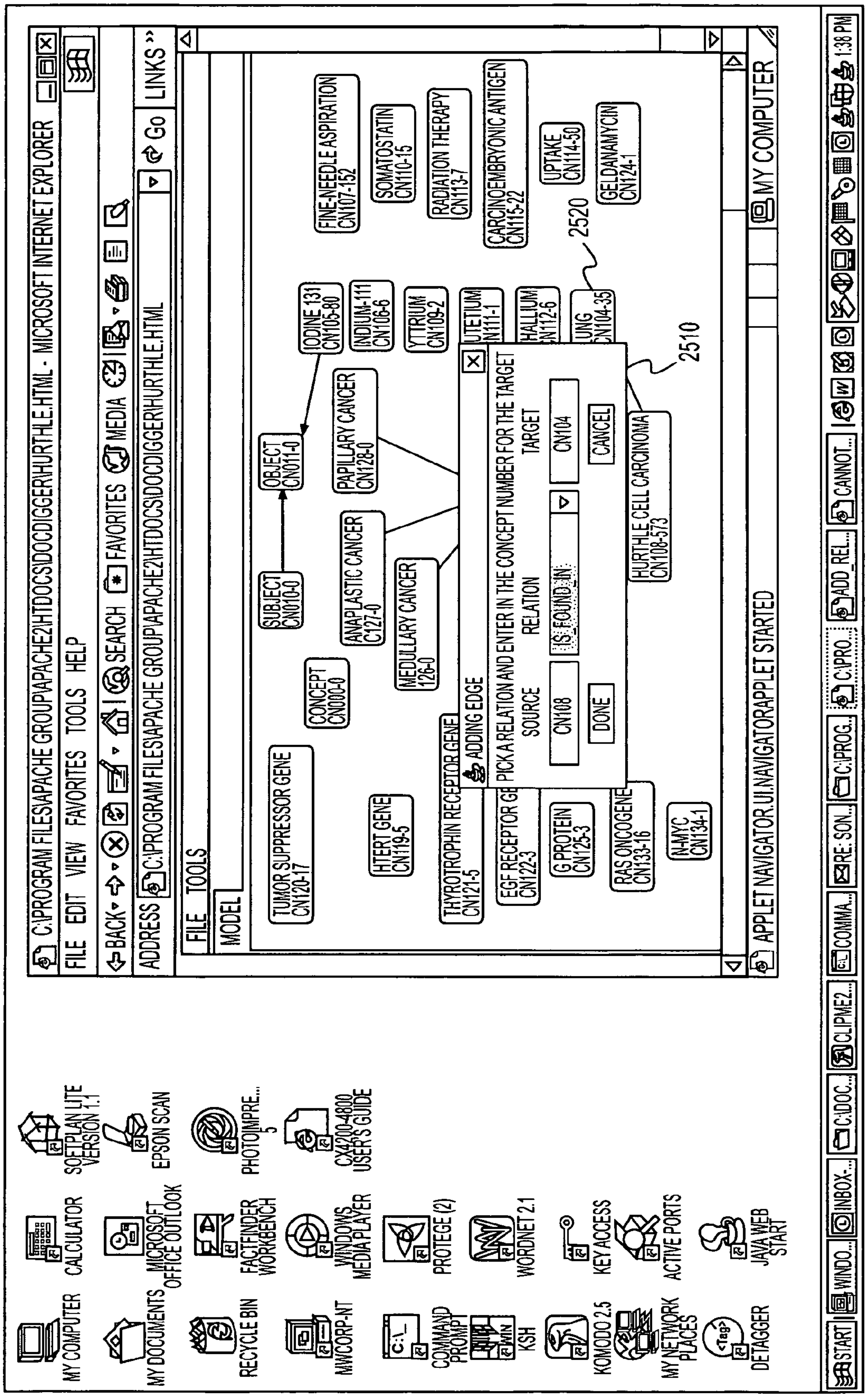

The user may then enter relation information (e.g., name of relation and target node) in a user interface. In this way, the user may dynamically alter model 120 by designating a relationship between a selected node and another node (i.e., the target node) in model 120. FIG. 25 illustrates an exemplary user interface display consistent with an embodiment of the present invention that tool 122 may display to accept user input for a relation. As shown in FIG. 25, a user may enter a name for the new relation and the target node (e.g., identified by concept name or concept number) for the relation to connect to, using a popup window 2510 "Adding Edge." For example, the relation may be "is found in," "is caused by," "includes," etc.

Figure 26:
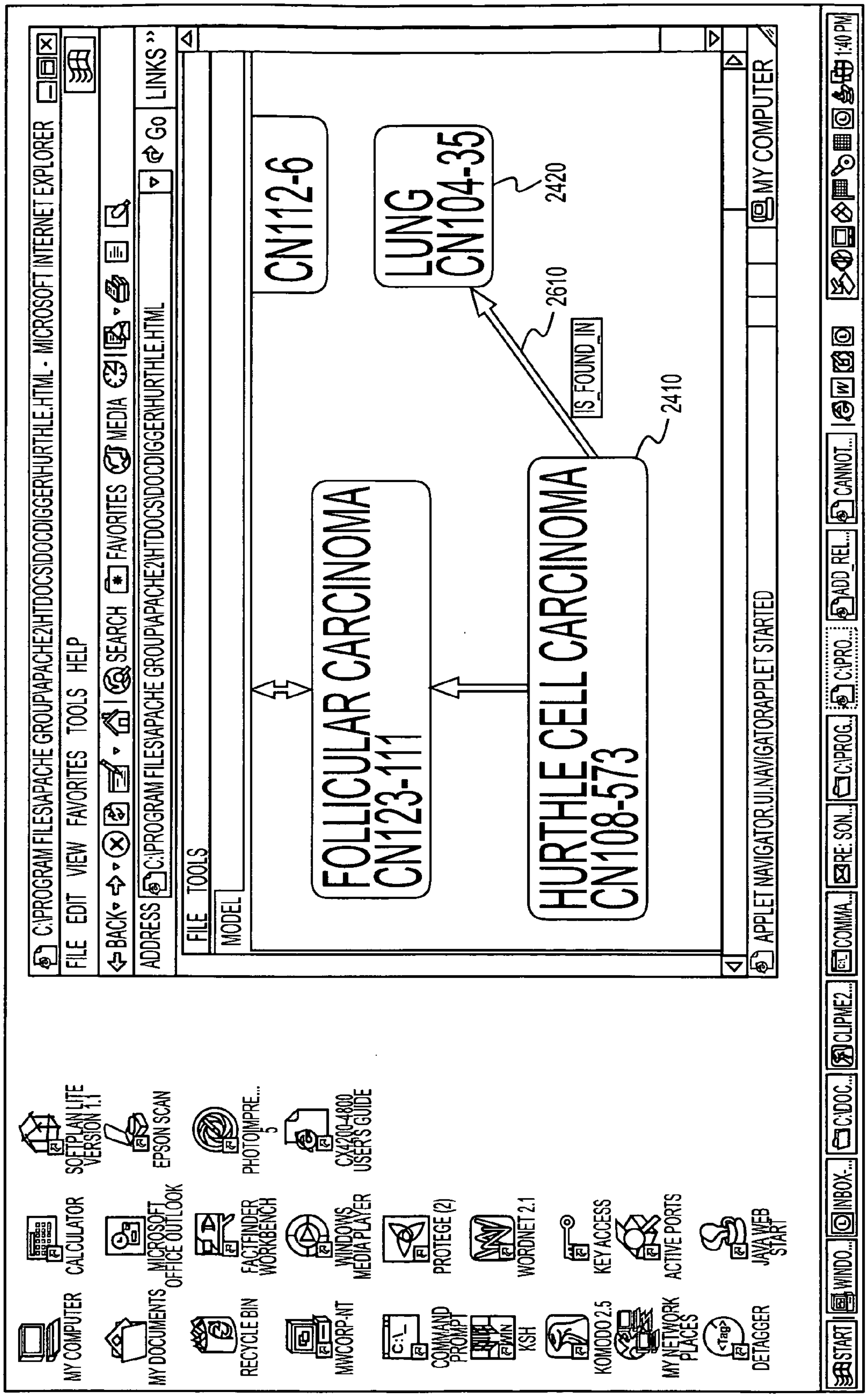

FIG. 26 illustrates an exemplary user interface display consistent with an embodiment of the present invention that includes model 120 and the new relation 2610 "is_found_in." As shown in FIG. 26, model 120 has been modified to show that "hurthle cell carcinoma" 2410 "is_found_in" "lung" 2420. This flexibility enables a user to modify model 120 and the resulting extractions to match the user's own mental map of a set of concepts.

Tool 122 may also assign verb inflections and troponyms that stand for relation 2610 "is_found_in," such as "is associated with," "is part of,", "is included in," etc. Tool 122 may also assign inflections (e.g., inflections of English verbs) automatically, and a user may add other verbs (and their inflections) by creating synonyms of relation 2610 "is_found_in."

Adding Synonyms to a Relation

Figure 27:
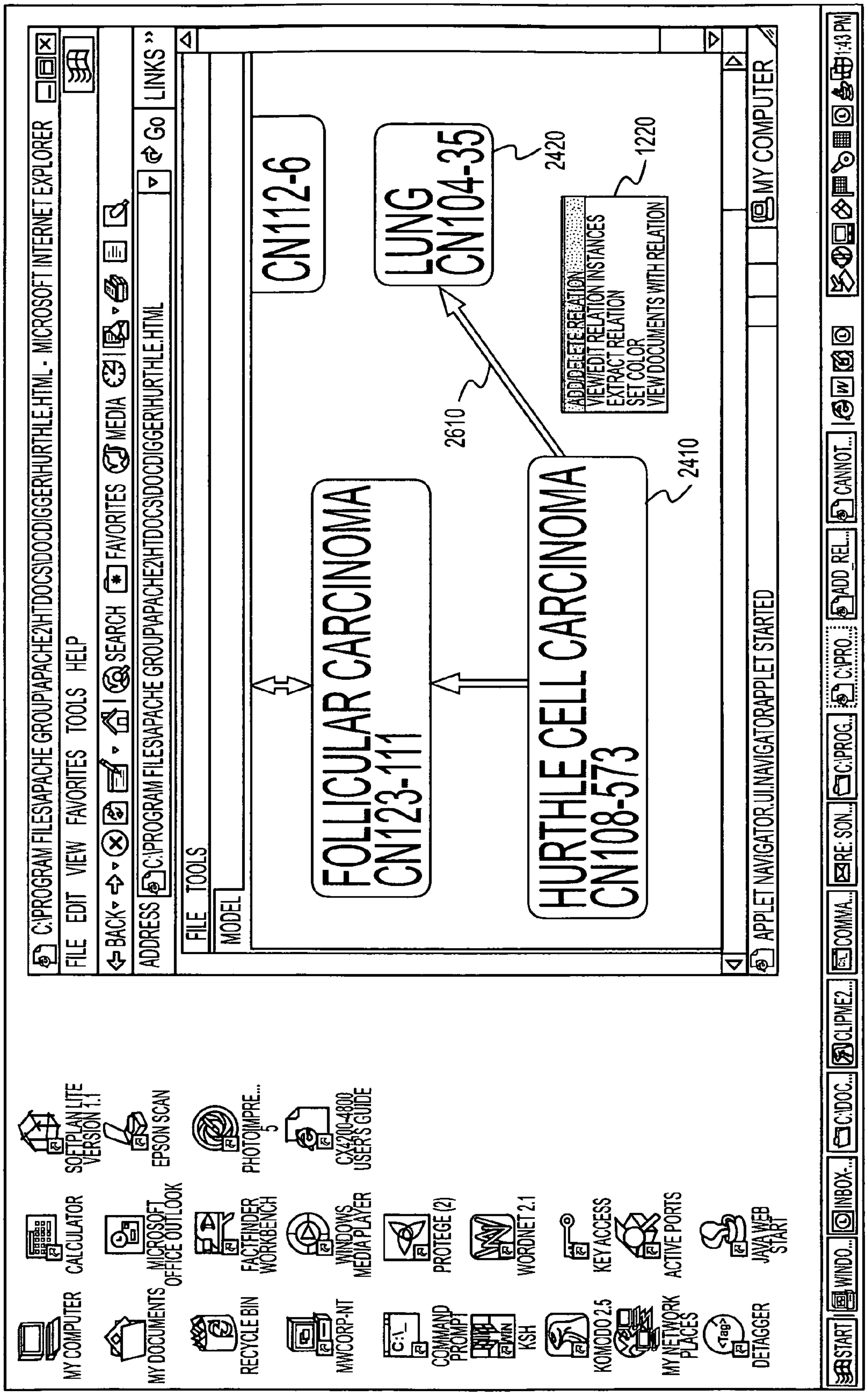

FIG. 27 illustrates an exemplary user interface display consistent with an embodiment of the present invention. As shown in FIG. 27, to add synonyms to a relation, a user may right click on the relation, for example relation 2610 "is_found_in" and choose View/Edit Relation Instances from selection menu 1220.

Figure 28:
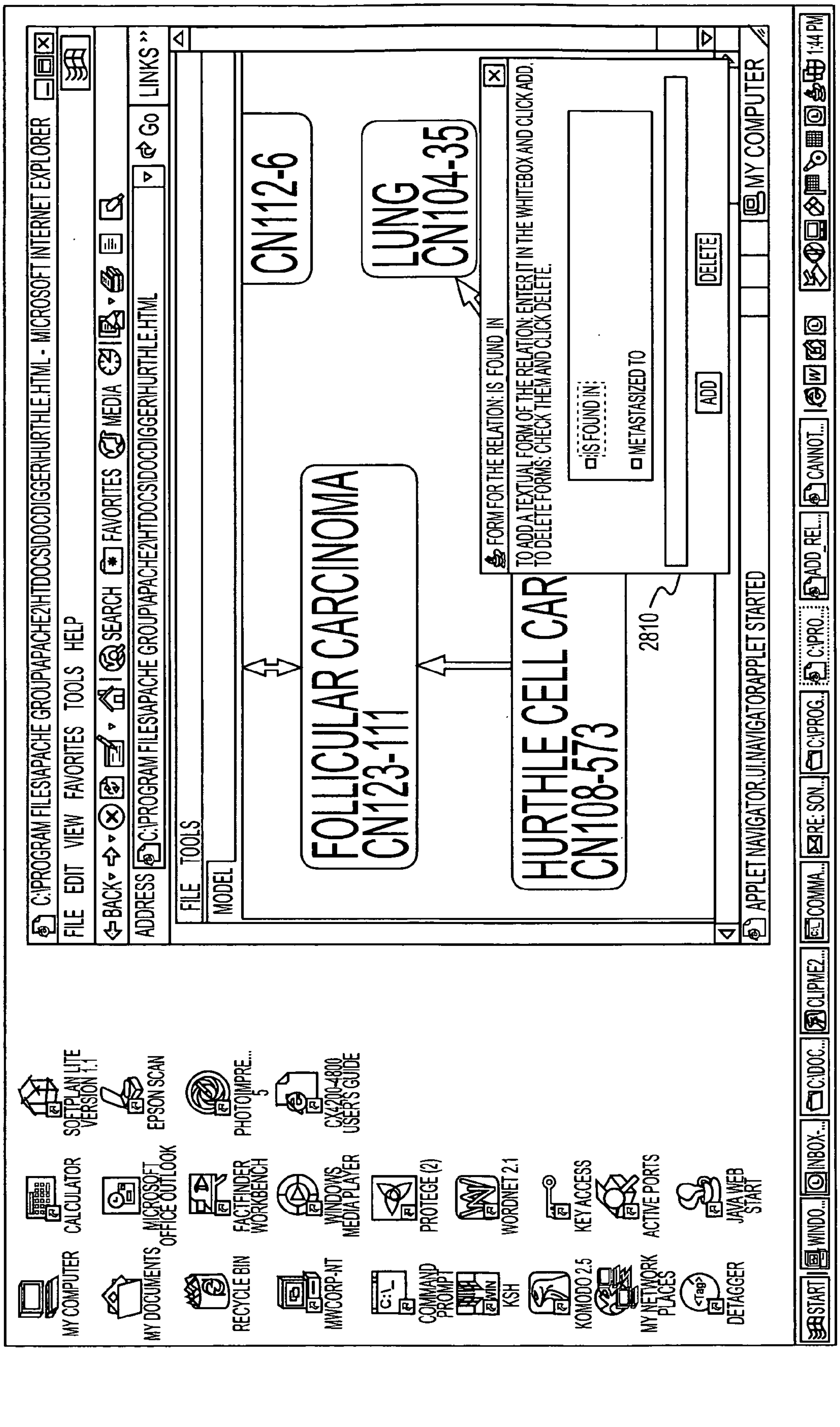

FIG. 28 illustrates an exemplary user interface display consistent with an embodiment of the present invention that tool 122 may present for the user to add a synonym to a relation. As shown in FIG. 28, a panel 2810 may display various verb clauses that the user may consider to have essentially the same meaning. Additionally or alternatively, a user may input his own synonyms for a relation to further customize model 120. One skilled in the art will recognize that the verb clauses (e.g., "is found in") illustrated in FIG. 28 are merely for illustration.

Figure 29:
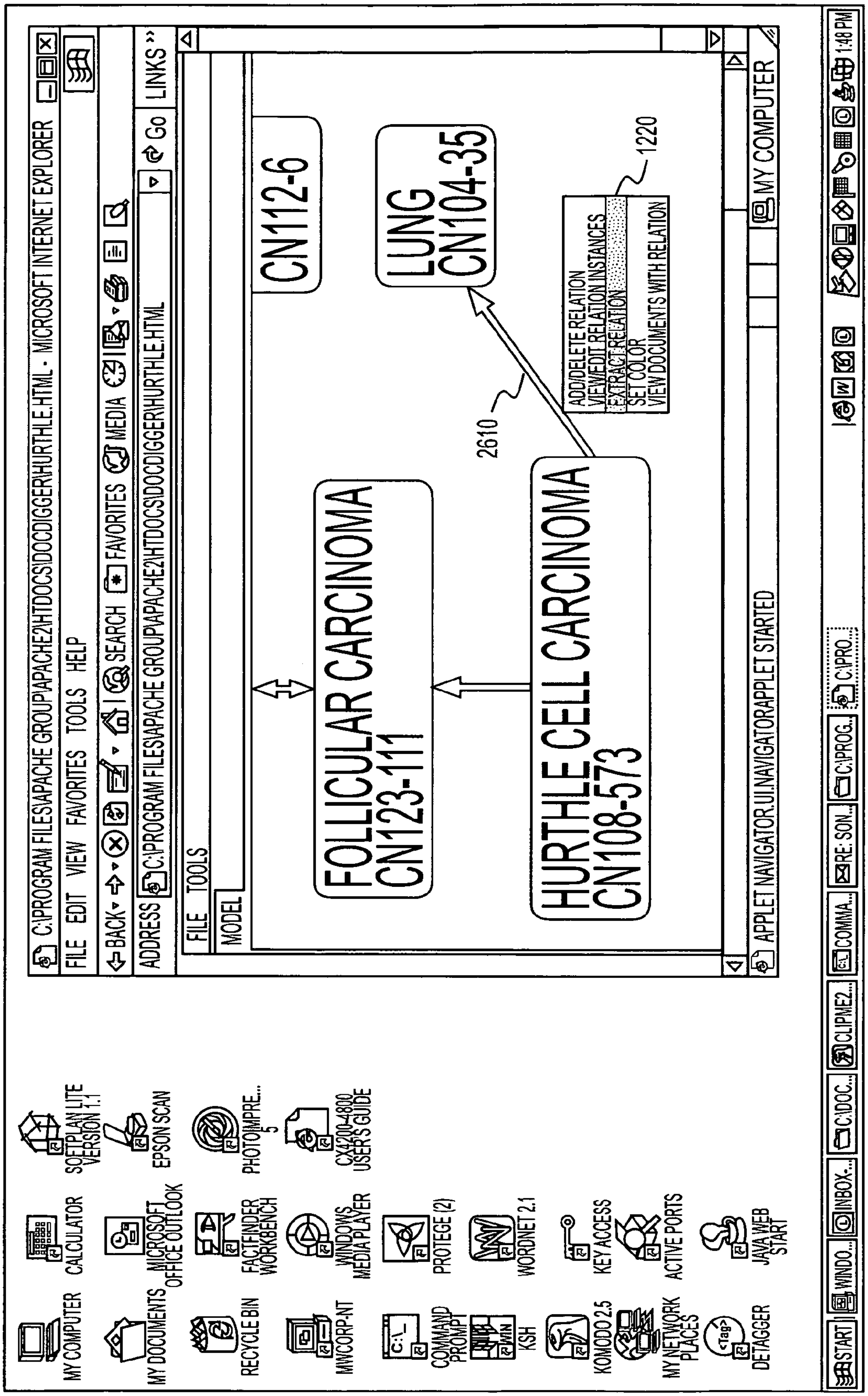

Next, the user may extract all instances of a relation from document set 116. FIG. 29 illustrates an exemplary user interface display consistent with an embodiment of the present invention that may allow a user to extract instances of a relation from document set 116. In one embodiment, a user may click on relation 2610 "is_found_in" and select "Extract Relation" from selection menu 1220, as shown in FIG. 29. After extracting instances of the relation, a user may view any documents that contain one or more instances of the relation and/or the related concepts.

Sharing Models

Figure 30:
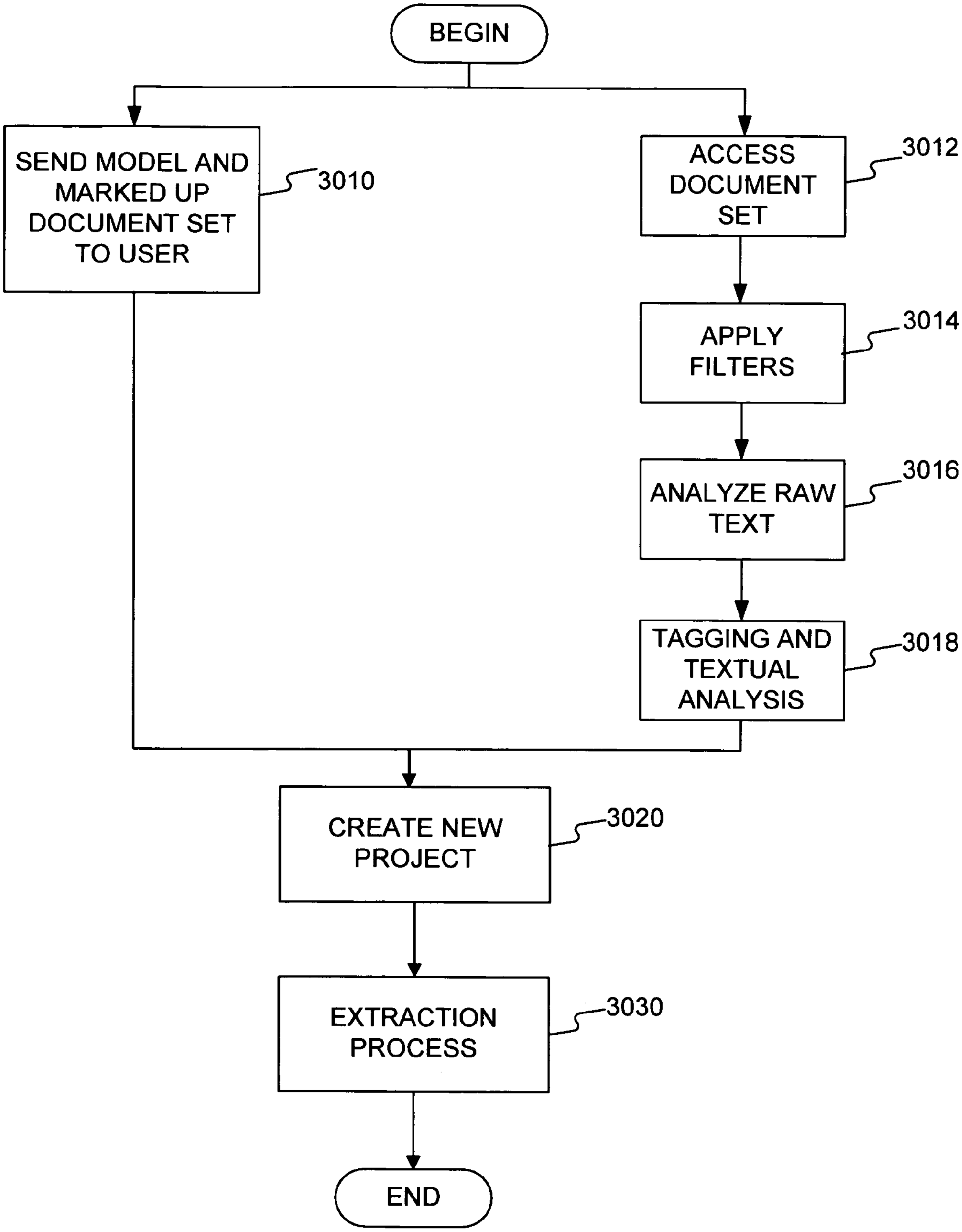
FIG. 30 is a flow diagram of exemplary steps performed by the system to share models consistent with embodiments of the present invention.

In one embodiment, models 120 may be shared among various users to enable collaborative research and improve efficiency. FIG. 30 is a flow diagram of exemplary steps performed by the system to share models consistent with embodiments of the present invention. As shown in FIG. 30, a user may transmit a model 120 and marked up document set 116 to a second user (step 3010). Alternatively, a second user may access a document set independently (step 3012), apply filters to the document set (3014), analyze the raw text (step 3016), and perform POS tagging and lexical analysis (step 3018), as described above.

The second user may use tool 122 to create a new project (step 3020), and perform an extraction process (step 3030), as described above with respect to FIG. 5.

Alternatively or additionally, users may sell, trade, or otherwise share models 120 via the Internet. For example, a website may include a collection of models 120 specifically designed for researchers looking to extract information from document sets 116 relating to certain topics. In one example, users may share models 120 relating to various clinical trials. In another example, users may share models 120 relating to sports, music, legal topics, news, health, travel, finance, technology, politics, education, or business. Models 120 may be accessible via a website for users to sell, buy, share, trade, and revise. In one example, tool 122 or an Internet website may receive a user's request for a document set 116 or a research topic, and may retrieve document set 116 together with a recommended model 120 that may relate to document set 116 or the research topic.

One skilled in the art will recognize that many means and methods may be used to create models 120. For example, a spreadsheet-like tabular display, a graph, or a table of information may be used to represent model 120.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for visually modeling information sought from a set of documents implemented using a computer having a processor and a display, comprising:

identifying a set of documents;

applying a filter to the set of documents to produce raw text;

analyzing the raw text using a lexica module and a POS (part of speech) tagger by operation of the processor;

creating a set of POS (part of speech) tagged documents based on the analysis of the raw text, the set of POS (part of speech) tagged documents corresponding to the set of documents;

presenting the analysis of the raw text to a user;

creating a plurality of concepts based on the analysis of the raw text;

creating a visual model comprising visual elements corresponding to the plurality of concepts;

presenting the visual model to the user on the display;

enabling the user to add a new visual element to the visual model, the new visual element corresponding to a new concept;

enabling the user to add a new relation between visual elements in the visual model, the new relation between visual elements representing a new relation between concepts corresponding to the visual elements;

receiving a definition of a concept from the user via a selection of a visual model corresponding to the concept;

generating extractors, each extractor corresponding to one of the visual elements or the relations between the visual elements in the visual model;

based on a user selection of one of the visual elements or the relations, extracting a POS (part of speech) tagged document from the set of POS (part of speech) tagged documents using the corresponding extractor, the extracted POS (part of speech) tagged document containing information related to the concept corresponding to the selected visual element or the selected relation;

presenting the extracted POS (part of speech) tagged document to the user;

customizing the visual model based on user input in response to the extracted POS (part of speech) tagged document; and exporting the customized model.

2. The method of claim 1, wherein the extractors are defined by the user.

3. The method of claim 1, wherein the extractors are assigned automatically.

4. The method of claim 1, further comprising:

extracting a POS (part of speech) tagged document from the set of POS (part of speech) tagged documents according to the customized model.

5. The method of claim 1, wherein customizing comprises:

identifying the visual elements related to the set of documents based on a lexica module;

receiving a selection of the visual elements from the user; and updating the visual model according to the selection.

6. The method of claim 1, wherein customizing comprises:

associating a unique identifier selected from the group consisting of a color, a font, and a shape with one of the elements of the visual display.

7. A method for visually modeling information sought from a set of documents implemented using a processor and a display, comprising:

identifying a set of documents;

applying a filter to the set of documents to produce raw text;

analyzing the raw text using a lexica module and a POS (part of speech) tagger by operation of the processor;

presenting the analysis of the raw text to a user;

creating a plurality of concepts based on the analysis of the raw text;

creating a visual model comprising visual elements corresponding to the plurality of concepts;

presenting the visual model to the user on the display;

enabling the user to add a new visual element to the visual model, the new visual element corresponding to a new concept;

enabling the user to add a new relation between visual elements in the visual model, the new relation between visual elements representing a new relation between concepts corresponding to the visual elements;

receiving a definition of a concept from the user via selection of a visual model corresponding to the concept;

generating extractors, each extractor corresponding to one of the visual elements or the relations between the visual elements in the visual model;

based on a user selection of one of the visual elements or the relations, extracting a document from the set of documents using the corresponding extractor, the extracted document containing information related to the concept corresponding to the selected visual element or the selected relation;

customizing the visual model based on user input in response to the extracted documents; and exporting the customized model.

8. The method of claim 7, wherein the extractors are defined by the user.

9. The method of claim 7, wherein the extractors are assigned automatically.

10. The method of claim 7, wherein analyzing the raw text using a lexica module and a POS (part of speech) tagger comprises:

searching the raw text to identify grammatical parts of speech and lexica.

11. The method of claim 7, wherein the visual elements include:

a synonym for the associated concept.

12. The method of claim 7, wherein creating a plurality of concepts based on the analysis of the raw text further comprises:

creating a data structure of the plurality of concepts in a database; and updating the data structure to indicate which documents in the set of documents include at least one of the plurality of concepts.

13. The method of claim 7, further comprising:

creating a POS (part of speech) tagged document based on the analysis of the raw text, the POS (part of speech) tagged document corresponding to the extracted document; and marking the POS (part of speech) tagged document based on the information related to the concept corresponding to the selected visual element or the selected relation.

14. The method of claim 7, wherein the extracted document comprises a subset of the set of documents.

15. The method of claim 7, wherein the extracted document is presented in a list of documents.

16. The method of claim 7, further comprising:

displaying the visual model using an entity-relationship diagram, wherein the visual elements are depicted as entities, and the relations between the visual elements are depicted as relations between the entities.

17. The method of claim 7, further comprising:
receiving a color specified by the user for each of the visual elements; and
adding the specified colors to the visual elements.

18. The method of claim 17, further comprising:
displaying the information related to the concept corresponding to the selected visual element using the specified colors for each of the visual elements.

19. The method of claim 7, further comprising:
exporting the set of documents together with the customized model.

20. The method of claim 7, further comprising:
exporting the set of documents together with the customized model using formats that facilitate at least one of sale, exchange, and reuse of the customized model with matching sets of documents.

21. The method of claim 7, further comprising:
extracting a document from the set of documents according to the customized model, the extracted document containing information related to the concept corresponding to the selected visual element.

22. The method of claim 7, further comprising:
displaying the model using one of: a document, a graph, a table, a map, a spreadsheet, and a chart.

23. The method of claim 7, further comprising:
modifying a document in the set of documents.

24. The method of claim 7, further comprising:
receiving a series of user inputs to extract a document from the set of documents using at least two visual elements in the visual model and the corresponding extractors; and
creating a new concept, wherein the new concept is based on the series of user inputs.

25. The method of claim 24, further comprising:
updating the visual model to include a visual element that represents the new concept.

26. The method of claim 25, further comprising:
automatically assigning a new extractor to the visual element of the new concept based on the series of user inputs; and
automatically updating a database based on the new extractor.

27. The method of claim 24, wherein the new concept is created by the user after extracting a document from the set of documents.

28. The method of claim 24, further comprising:
assigning an extractor to an existing concept based on the series of user inputs.

29. The method of claim 24, wherein the series of user inputs include a user selection of text to retrieve from the set of documents.

30. The method of claim 7, further comprising:
processing the extracted document to create post-extraction information.

31. The method of claim 30, wherein processing the extracted document to create post-extraction information includes:
aggregating the extracted document into one of: a document, a graph, a table, a map, a spreadsheet, and a chart.

32. The method of claim 30, wherein processing the extracted document to create post-extraction information includes:
receiving a user selection of categories for the extracted document.

33. The method of claim 30, wherein processing the extracted document to create post-extraction information includes:
assigning a status to the extracted document.

34. The method of claim 7, further comprising:
presenting the extracted document to the user; and
marking the information related to the concept contained in the extracted document with an adjustable indicator to indicate to the user where the information is located in the document.

35. The method of claim 34, wherein the adjustable indicator comprises at least one of color, underlining, and font change.

36. A system for visually modeling information sought from a set of documents, comprising:
a processor;
an identifying component configured to select a set of documents;
a filter component configured to apply a filter to the set of documents to produce raw text;
an analyzing component configured in the processor to analyze the raw text using a lexica module and a POS (part of speech) tagger;
a concept component configured to create a plurality of concepts based on the analysis of the raw text;
a visual model component configured in the processor to create a visual model comprising visual elements corresponding to the plurality of concepts;
a display configured to present the analysis of the raw text and the visual model to a user;
a graphical user interface configured to enable a user to add a new visual element to the visual model, the new visual element corresponding to a new concept;
the graphical user interface further configured to enable the user to add a new relation between the visual elements in the visual mode, the new relation between visual elements representing a new relation between concepts corresponding to the visual elements;
a concept definition component configured to receive a definition of a concept from the user via a selection of a visual model corresponding to the concept;
a generation component configured in the processor to generate extractors, each extractor corresponding to one of the visual elements or the relations between the visual elements in the visual model;
an extraction component configured in the processor to extract a document from the set of documents using the corresponding extractor, based on a user selection of one of the visual elements or the relations, the extracted document containing information related to the concept corresponding to the selected visual element or the selected relation;
an customization component configured in the processor to customize the visual model based on user input in response to the extracted documents; and
an export component configured to export the customized model.

37. A system for visually modeling information sought from a set of documents, comprising:
means for identifying a set of documents;
means for applying a filter to the set of documents to product raw text;
means for analyzing the raw text using a lexica module and a POS (part of speech) tagger;
means for presenting the analysis of the raw text to a user;
means for creating a plurality of concepts based on the analysis of the raw text;
means for creating a visual model comprising visual elements corresponding to the plurality of concepts;
means for presenting the visual model to the user;

means for enabling the user to add a new visual element to the visual model, the new visual element corresponding to a new concept;

means for enabling the user to add a new relation between visual elements in the visual model, the new relation between visual elements representing a new relation between concepts corresponding to the visual elements;

means for receiving a definition of a concept from the user via a selection of a visual element corresponding to the concept;

means for generating extractors, each extractor corresponding to one of the visual elements or the relations between the visual elements in the visual model;

means for, based on a user selection of one of the visual elements or the relations, extracting a document from the set of documents using the corresponding extractor, the extracted document containing information related to the concept corresponding to the selected visual element or the selected relation;

means for customizing the visual model based on user input in response to the extracted documents; and means for exporting the customized model.

38. A computer-readable medium including instructions for performing a method for visually modeling information sought from a set of documents, the method comprising:

identifying a set of documents;

applying a filter to the set of documents to produce raw text;

analyzing the raw text using a lexica module and a POS (part of speech) tagger;

presenting the analysis of the raw text to a user;

creating a plurality of concepts based on the analysis of the raw text;

creating a visual model comprising visual elements corresponding to the plurality of concepts;

presenting the visual model to the user;

enabling the user to add a new visual element to the visual model, the new visual element corresponding to a new concept;

enabling the user to add a new relation between visual elements in the visual model, the new relation between visual elements representing a new relation between concepts corresponding to the visual elements;

receiving a definition of a concept from the user via a selection of a visual element corresponding to the concept;

generating extractors, each extractor corresponding to one of the visual elements or the relations between the visual elements in the visual model; and based on a user selection of one of the visual elements or the relations, extracting a document from the set of documents using the corresponding extractor, the extracted document containing information related to the concept corresponding to the selected visual element or the selected relation, customizing the visual model based on user input in response to the extracted documents, and exporting the customized model.

* * * * *

UNITED STATES PATENT AND TRADEMARK OFFICE

CERTIFICATE OF CORRECTION

PATENT NO. : 7,890,533 B2
APPLICATION NO. : 11/434847
DATED : February 15, 2011
INVENTOR(S) : Victor J. Pollara It is certified that error appears in the above-identified patent and that said Letters Patent is hereby corrected as shown below:

Claim 36, col. 20, line 50 “an customized component” should read -- a customized component --.

Signed and Sealed this
Twelfth Day of June, 2012

David J. Kappos
*Director of the United States Patent and Trademark Office*